United States Patent [19]
McKee et al.

[11] Patent Number: 5,488,694
[45] Date of Patent: Jan. 30, 1996

[54] BROADCASTING HEADERS TO CONFIGURE PHYSICAL DEVICES INTERFACING A DATA BUS WITH A LOGICAL ASSIGNMENT AND TO EFFECT BLOCK DATA TRANSFERS BETWEEN THE CONFIGURED LOGICAL DEVICES

[75] Inventors: Mark P. McKee, Alameda; John Zapisek, Santa Clara; David M. Bulfer, Santa Clara; John M. Long, Santa Clara; John R. Nickolls, Santa Clara; William T. Blank, Santa Clara, all of Calif.

[73] Assignee: MasPar Computer Company, Sunnyvale, Calif.

[21] Appl. No.: 937,639

[22] Filed: Aug. 28, 1992

[51] Int. Cl.[6] .......................... G06F 13/00; G06F 13/138
[52] U.S. Cl. ...................... 395/824; 364/243; 364/246.4; 364/254.7; 364/259.6
[58] Field of Search ....................... 395/275; 364/DIG. 1

[56] References Cited

U.S. PATENT DOCUMENTS

| | | | |
|---|---|---|---|
| 3,900,836 | 8/1975 | Salvo | 340/172.5 |
| 4,214,305 | 7/1980 | Tokita et al. | 364/200 |
| 4,360,870 | 11/1982 | McVey | 395/275 |
| 4,373,181 | 2/1983 | Chisholm et al. | 395/275 |
| 4,556,953 | 12/1985 | Caprio et al. | 364/900 |
| 4,586,128 | 4/1986 | DeWoskin | 364/200 |
| 4,688,168 | 8/1987 | Gudaitis et al. | 364/200 |
| 4,729,095 | 3/1988 | Colley et al. | 364/200 |
| 4,760,572 | 7/1988 | Tomikawa | 370/94 |
| 4,875,158 | 10/1989 | Ashkin et al. | 364/200 |
| 4,901,232 | 2/1990 | Harrington et al. | 364/200 |
| 4,925,311 | 5/1990 | Neches et al. | 364/200 |
| 4,954,987 | 9/1990 | Auvinen et al. | 365/189.02 |
| 5,089,953 | 2/1992 | Ludicky | 395/425 |
| 5,097,410 | 3/1992 | Hester et al. | 395/275 |
| 5,131,081 | 7/1992 | MacKenna et al. | 395/275 |
| 5,193,152 | 3/1993 | Smith | 364/200 |
| 5,257,391 | 10/1993 | DuLac et al. | 364/200 |
| 5,301,297 | 4/1994 | Menon et al. | 395/575 |
| 5,351,246 | 9/1994 | Blaum et al. | 371/10.1 |

Primary Examiner—Thomas C. Lee
Assistant Examiner—Marc K. Weinstein
Attorney, Agent, or Firm—David H. Carroll; Skjerven, Morrill, MacPherson, Franklin & Friel

[57] ABSTRACT

To effect a block data transfer between a plurality of physical I/O devices coupled through interfaces to an I/O channel ("IOC") bus, a source logical device is established by programmably assigning to each of the physical device interfaces a logical device identifier, a leaf identifier determining when the physical device participates relative to the first data transfer in the block data transfer, a burst count specifying the number of consecutive transfers for which the physical device is responsible when its interleave period arrives, and an interleave factor identifying how often the physical device participates in the block data transfer. A destination logical device is similarly established. The source and logical devices are then activated to accomplish a block transfer of data between them. To permit different I/O processors to operate independently in making I/O requests, requests from each I/O processor are communicated to an IOC controller over another bus, which need not be a high performance bus, and are serviced to construct header packets in a transaction buffer identifying IOC transactions, including source and destination logical devices. When each packet is finished, the responsible I/O processor puts a pointer into a transaction queue, which is a FIFO register. Each IOC transaction is initiated as its corresponding pointer is popped from the transaction queue. Apparatus embodiments are disclosed as well.

21 Claims, 23 Drawing Sheets

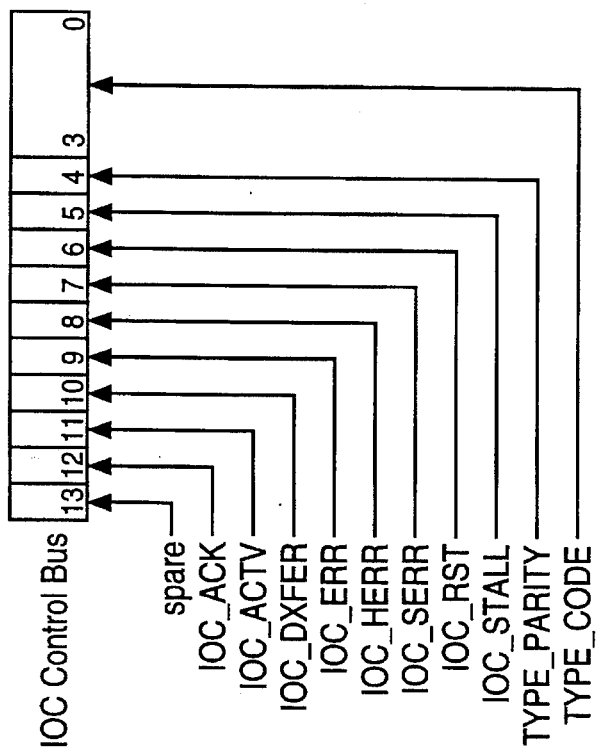
FIG. 5A

FIG. 5B

VME BUS SIDE

750: WRITE HEADER WORDS INTO A HEADER PACKET FOR I/O PROCESSOR

752: WRITE POINTER TO HEADER PACKET

754: MONITOR STATUS WORD

756: GENERATE INTERRUPT? (ALT FOR 754)

712  714  716
ADR_X

TRANSACTION QUEUE 710

722

HEADER PACKET $X_1$

HEADER PACKET $X_n$

STATUS WORD X

TRANSACTION BUFFER 720    724

700

IOC BUS SIDE

758: ADR X READ FROM FIFO

760: DRIVE Q-BLOCK ONTO IOC BUS UNTIL SET END_IOP BIT DETECTED

761: MONITOR IOC UNTIL (A) IOC_DXFR AND IOC_ACTV ARE DEASSERTED; OR (B) ERROR IS ASSERTED

762: WRITE COMPLETION STATUS TO Q-BLOCK

FIG. 7

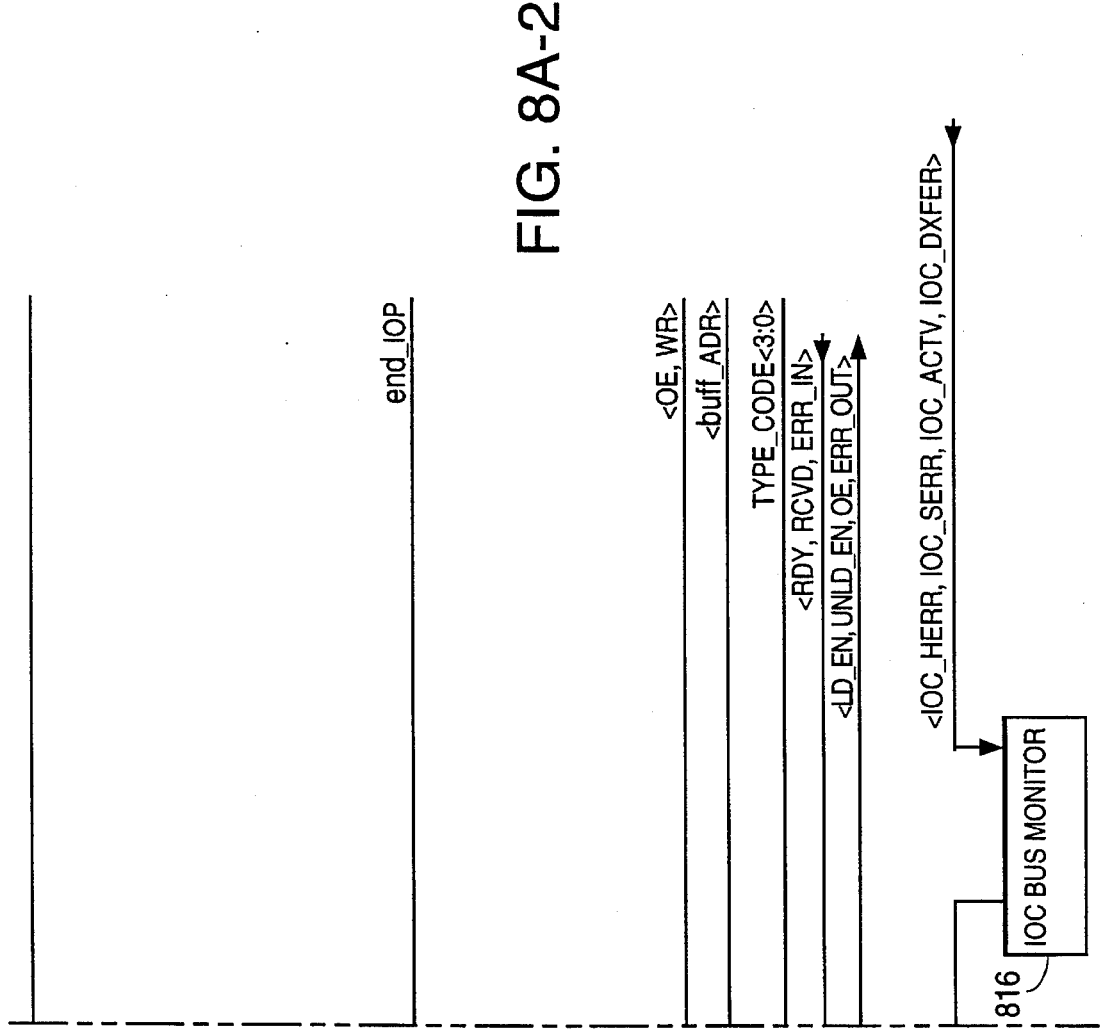

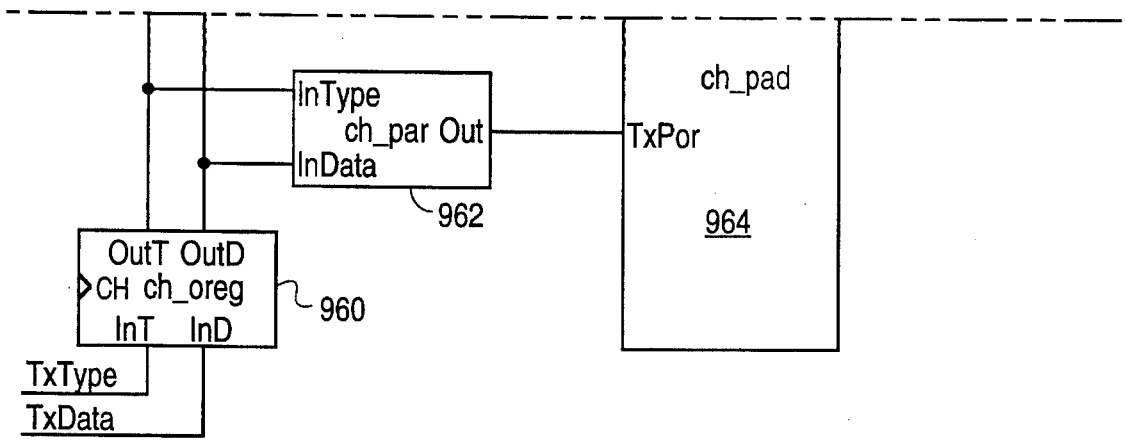
FIG. 9C-2
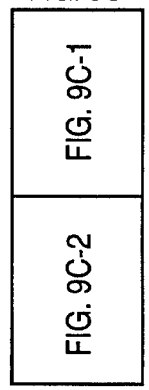
KEY TO FIG. 9C
FIG. 9C-1
FIG. 9C-2

```c
static char acRcs[] =
    "$Header: interleaf.c,v 1.6 91/08/06 16:06:55 jzap Exp $";

#include "chil.h"

#define nLEAFBITS       2
define nBURSTBITS      4 unsigned        auPhysDevAddr[ 32];

unsigned        nLeafBits = nLEAFBITS;
unsigned        nBurstBits = nBURSTBITS;
unsigned        nInterBits;     /* nLeafBits + nBurstBits */ unsigned        nLeaves;
unsigned        nBurstWords;
unsigned        nInterWords;    /* nLeaves * nBurstWords */ unsigned        uLeafMask;
unsigned        uBurstMask;
unsigned        uHiOrdMask;     /* ~ (uLeafMask | uBurstMask) */

InterConfig()
{   unsigned        uLeafVal, uLeafNum;

nInterBits = nLeafBits + nBurstBits;
    nInterWords = 1 << nInterBits;
    nBurstWords = 1 << nBurstBits;
    nLeaves = 1 << nLeafBits;
    uHiOrdMask = ~ (nInterWords - 1);
    uBurstMask = nBurstWords - 1;
    uLeafMask = ~uHiOrdMask & ~uBurstMask;
    uLeafVal = 0;
    for( uLeafNum = 0; uLeafNum < nLeaves; uLeafNum++)
    {   PutType( CH_TY_PW, auPhysDevAddr[ uLeafNum] + CH_REG_IMASK);
        PutType( CH_TY_ND, uLeafMask);
        PutType( CH_TY_PW, auPhysDevAddr[ uLeafNum] + CH_REG_IVAL);
        PutType( CH_TY_ND, uLeafVal);
        uLeafVal += nBurstWords;
    }
}
```

FIG. 10A

```
XferSetup( uStartAddr, uWordCount)
unsigned            uStartAddr;
unsigned            uWordCount;
{   unsigned        uFinalAddr;
    unsigned        uStartIncr, uFinalIncr;
    unsigned        uStartLeaf, uFinalLeaf;
    unsigned        uInterAddr, uInterCount;
    unsigned        uLeafNum;

uFinalAddr = uStartAddr + uWordCount;
    uStartIncr = uStartAddr & uBurstMask;
    uFinalIncr = uFinalAddr & uBurstMask;
    uStartLeaf = (uStartAddr & uLeafMask) >> nBurstBits;
    uFinalLeaf = (uFinalAddr & uLeafMask) >> nBurstBits;
    uStartAddr = (uStartAddr & uHiOrdMask) >> nLeafBits;
    uFinalAddr = (uFinalAddr & uHiOrdMask) >> nLeafBits;
    uInterAddr = uStartAddr + nBurstWords;
    uInterCount = uFinalAddr - uStartAddr;

*/
for( uLeafNum = 0; uLeafNum < nLeaves; uLeafNum++)
{   PutType( CH_TY_LSEL, uLeafNum * nBurstWords);
    if( uLeafNum == uStartLeaf && uLeafNum == uFinalLeaf)
    {   uInterAddr -= nBurstWords;
        PutType( CH_TY_IWC, uInterCount - uStartIncr + uFinalIncr);
        PutType( CH_TY_IBA, uInterAddr + uStartIncr);
    }
    else if( uLeafNum == uStartLeaf)
    {   uInterAddr -= nBurstWords;
        uInterCount += nBurstWords;
        PutType( CH_TY_IWC, uInterCount - uStartIncr);
        PutType( CH_TY_IBA, uInterAddr + uStartIncr);
    }
    else if( uLeafNum == uFinalLeaf)
    {   uInterCount -= nBurstWords;
        PutType( CH_TY_IWC, uInterCount + uFinalIncr);
        PutType( CH_TY_IBA, uInterAddr);
    }
    else
    {   PutType( CH_TY_IWC, uInterCount);
        PutType( CH_TY_IBA, uInterAddr);
    }
}
}
```

FIG. 10B

```
PutType( iType, iVal)
int                         iType, iVal;
{
    if( iType == CH_TY_PW)
    {   printf( "PHYW=0x%08X %s=", iVal);
        iVal &= 0xFFFF;
        printf( "%s=",
            iVal == CH_REG_IMASK ? "IMSK" : iVal == CH_REG_IVAL ? "IVAL" : "?");
    }
    else if( iType == CH_TY_ND)
        printf( "0x%08X\n", iVal);
    else if( iType == CH_TY_LSEL)
        printf( "LSEL=0x%08X ", iVal);
    else if( iType == CH_TY_IBA)
        printf( "IBA=0x%08X ", iVal);
    else if( iType == CH_TY_IWC)
        printf( "IWC=0x%08X\n", iVal);
} main( argc, argv)
int                         argc;
char*                       argv[];
{   int                     iLeaf, iSa, iWc;

if( argc != 3)
        Usage();
    if( sscanf( argv[ 1], "%x", &nLeafBits) != 1)
        Usage();
    if( sscanf( argv[ 2], "%x", &nBurstBits) != 1)
        Usage();
    if( nLeafBits > 5)
        Usage();
    if( nLeafBits + nBurstBits > 16)
        Usage();
    for( iLeaf = 0; iLeaf < (1 << nLeafBits); iLeaf++)
        auPhysDevAddr[ iLeaf] =
            0xFF000000 & iLeaf << 23 | 0x00010000 & iLeaf << 16;
    InterConfig();
    printf( "\n");
    for( iWc = 0; iWc <= 2 * nInterWords; iWc++)
    {   printf( "#### WC=0x%08X ####\n\n", iWc);
        for( iSa = 0x400; iSa < 0x400 + nInterWords; iSa++)
        {   printf( "SA=0x%08X\n", iSa);
            XferSetup( iSa, iWc);
            printf( "\n");
        }
    }
}

Usage()
{
    printf( "usage: interleaf #LeafBits #BurstBits (max total 16)\n");
    exit( -1);
}
```

FIG. 10C

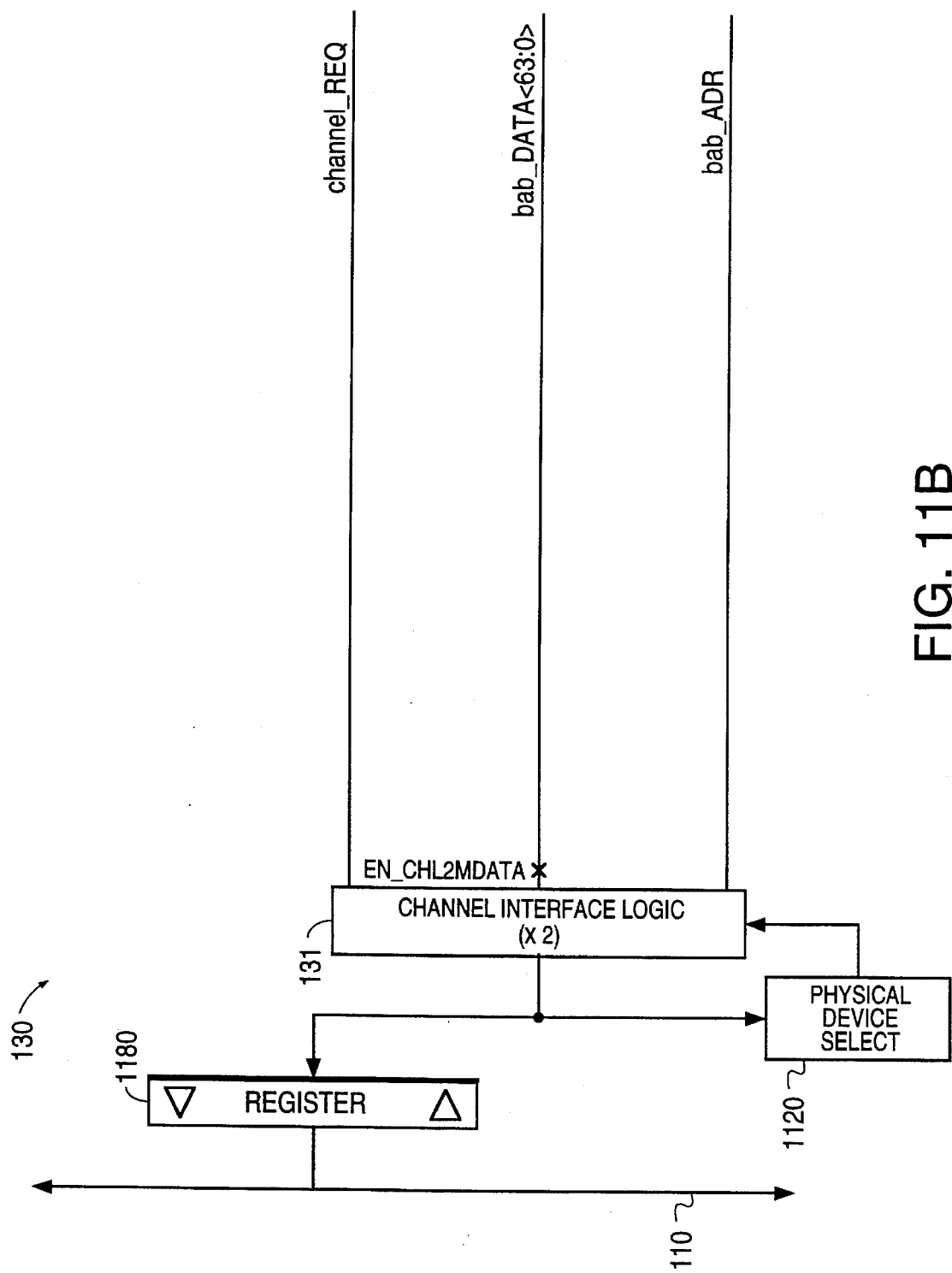

BROADCASTING HEADERS TO CONFIGURE PHYSICAL DEVICES INTERFACING A DATA BUS WITH A LOGICAL ASSIGNMENT AND TO EFFECT BLOCK DATA TRANSFERS BETWEEN THE CONFIGURED LOGICAL DEVICES

BACKGROUND OF THE INVENTION

1. Field of the Invention

The invention relates to computer input/output channels, and more particularly to methods and apparatus for conducting transactions on a high performance input/output channel.

2. Description of Related Art

High performance computer systems including the MP-1™ and MP-2™ massively parallel processors available from Maspar Computer System, Inc., Sunnyvale, Calif., typically require high speed and high capacity data transactions for efficient operation. One approach is to use input/output ("I/O") devices that support high speed, high capacity data transactions. An I/O device can achieve high speed by using high clock rates and by providing wide parallel buses, and can achieve high capacity by enlarging its physical size. Unfortunately, high performance computer systems typically impose limitations on clock rates and the parallel bus width, and on the size of the I/O device boards they will accept. I/O device boards exceeding these limitations cannot conveniently be used.

Another approach is to place a number of relatively small capacity I/O devices of a particular type on one data bus, and to coordinate their operation so that a single high capacity device is emulated. Specifying a data transfer involving multiple I/O devices typically requires many control bus operations to achieve the necessary synchronization or serialization. Control can be accomplished with one or more I/O processors ("IOP") that initiate and monitor I/O data transfers. Unfortunately, the use of frequent control bus operations tends to reduce the data transfer rate.

High performance computer systems also typically require a variety of I/O device types, each of which may have its own IOP. If permitted to operate independently, these IOPs will cause interfering transactions to occur on the data bus. Several techniques have been developed to allow multiple I/O processors to make I/O requests independent of one another. For example, read-modify-write techniques and a fully interlocked series of write operations are sometimes used, but these techniques sacrifice overall data rate since they involve holding the shared resource until a single I/O processor is through generating and servicing the request. Another approach involves the use of dedicated control busses for each individual I/O processor, which has the disadvantage of requiring an unwieldy large number of pins.

Hence, a need arises for a cost-effective high performance I/O system that provides high capacity and high bandwidth with relatively little system overhead.

SUMMARY OF THE INVENTION

The present invention provides enhanced I/O channel performance in permitting physically separate I/O devices to be coordinated into a single logical I/O device with higher performance and capacity, and permits separate I/O processors to operate independently of one another in making I/O channel requests.

These and other advantages are achieved in the present invention, which in one embodiment is a method useful in an input/output ("I/O") channel of a data processing system for effecting a block data transfer between a plurality of physical I/O devices coupled through respective associated interfaces to an I/O bus. At least one logical device is established from a number of the physical I/O devices by programmably assigning to each of the physical device interfaces a logical device identifier, a leaf identifier determining when the physical device participates relative to the first data transfer in the block data transfer, a burst count specifying the number of consecutive transfers for which the physical device is responsible when its interleave period arrives, and an interleave factor identifying how often the physical device participates in the block data transfer. One of the logical devices is selected as a source logical device and another as a destination logical device by placing on the I/O bus suitable header words. The source and logical devices are then activated to accomplish a block transfer of data between them.

In an apparatus embodiment, an input/output ("I/O") channel includes an IOC bus, a number of physical devices, and individual means for interfacing the physical devices to the bus. Each of the interfacing means includes means for identifying a unique physical address and means for programmably identifying a logical address, means for physically accessing the interfacing means to set respective configuration registers therein; and means for logically accessing the interface means in groups of one or more to effect block data transfer operations between the groups.

In a further method embodiment useful with an IOC bus and any other bus, requests from an I/O processor communicated to the IOC channel controller over the other bus are serviced to construct in the IOC channel controller a header packet identifying an IOC transaction type, a source device and addressing therefor, and a destination device and addressing therefor, for participation in the IOC transaction. The IOC transaction is initiated by broadcasting the header packet onto the IOC bus to select one or more of the physical devices as a source device and one or more of the physical devices as a destination device. The IOC transaction is completed by driving data conforming to the IOC transaction type from the selected source device onto the IOC bus for acquisition by the selected destination device.

In a further apparatus embodiment involving an IOC bus and any other bus, a transaction buffer accessible by an I/O processor over the other bus is used by the I/O processor for assembling headers to identify source and destination devices for IOC transactions and to set address parameters of the source and destination devices. A transaction queue accessible by the I/O processor over the other bus is used by the I/O processor upon completion of header assembly to request an IOC transaction by pushing a pointer to the transaction buffer block of each completely assembled header onto the transaction queue. A transaction controller serially reads pointers from the transaction queue in the absence of active IOC transactions on the IOC bus to address the transaction buffer, which furnishes for each pointer a header from its transaction buffer block onto the IOC bus for selecting source and destination devices, setting their address parameters, and initiating an IOC transaction.

BRIEF DESCRIPTION OF THE FIGURES

FIGS. 5A, 5B, 5C and 5D are pictorial representations of data channel bus assignments for, respectively, the normal access format, the physical access format, the configuration access format, and the data control bus.

FIG. 7 is a pictorial representation of an organization of a transaction queue and a transaction buffer.

FIGS. 8A-1, 8A-2 and 8B are contiguous sections of a block schematic diagram of a transaction controller.

FIGS. 9A, 9B, 9C-1, 9C-2 and 9D are contiguous sections of a block schematic diagram of a channel interface logic circuit.

FIGS. 10A, 10B and 10C is a listing in the C language showing an embodiment of a method for determining certain parameters useful in interleaving.

FIGS. 11A and 11B are contiguous sections of an IORAM physical device.

DESCRIPTION OF THE PREFERRED EMBODIMENT

Figure 1:
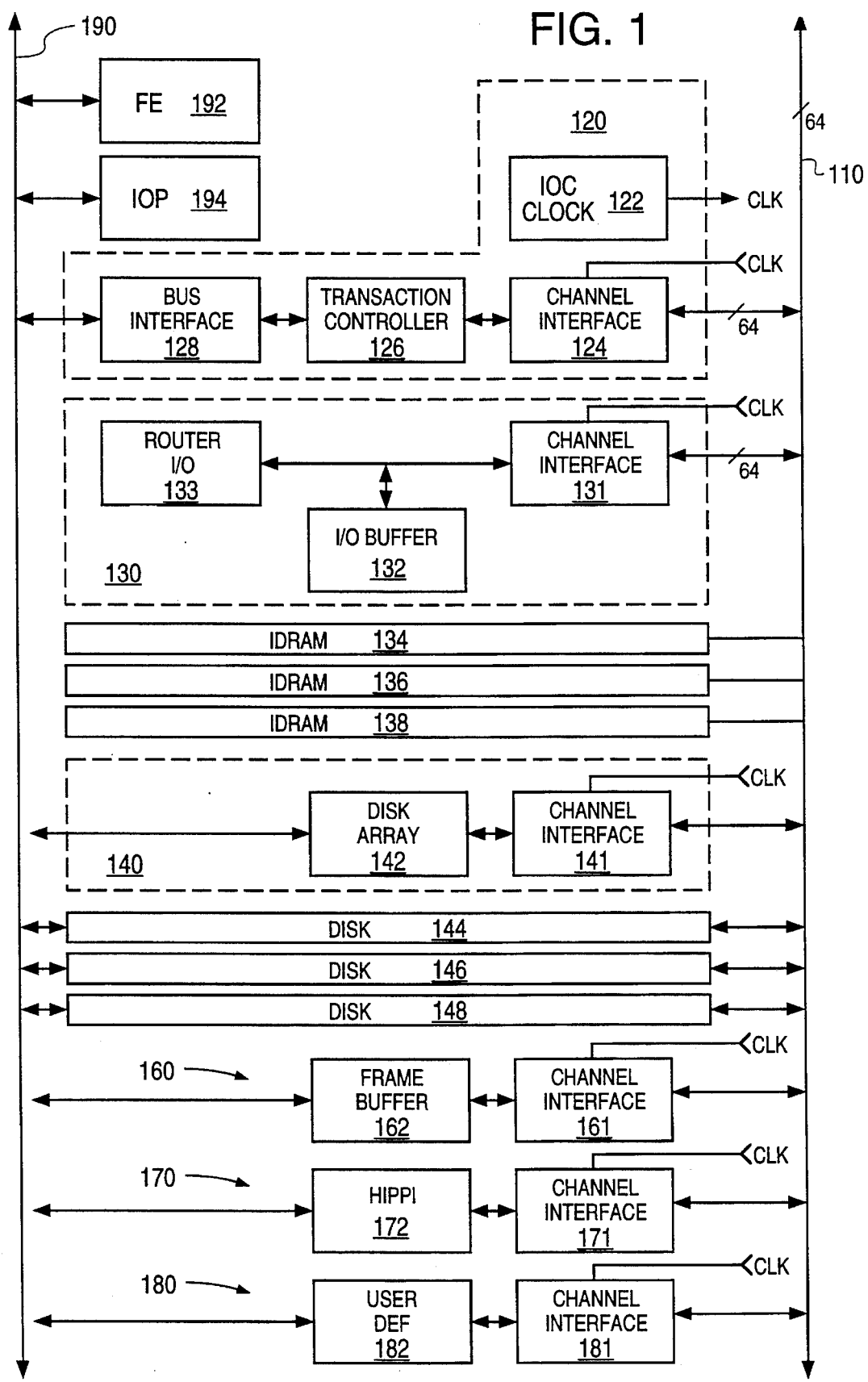
FIG. 1 is a block schematic diagram of an input/output system.

Illustratively, a massively parallel computer of the type described in several copending patent applications, including Nickolls et al., "Scalable Inter-Process and Processor I/O Messaging System for Parallel Processing Arrays, "Ser. No. 07/461,492 filed Jan. 5, 1990, now U.S. Pat. No. 5,280,474; Zapisek, "Router Chip for Processing Routing Address Bits and Protocol Bits Using Same Circuitry," Ser. No. 07/461,551 filed Jan. 5, 1990, now abandoned; Taylor, "Network and Method for Interconnecting router Elements Within Parallel Computer System," Ser. No. 07/461,572 filed Jan. 5, 1990, now U.S. Pat. No. 5,313,590; and Kim et al., "Parallel Processor Memory System," Ser. No. 07/461,567 filed Jan. 5, 1990, now abandoned, which are incorporated herein by reference in their entirety, uses a backplane into which various printed circuit board assemblies ("PCBA"), generally referred to herein as "boards," are plugged. This arrangement imposes limitations on the physical size of the boards and on the number of connectors per board. Illustratively, using current technology, a board measuring 14 inches on an edge is limited as a practical matter to about 500 backplane signal connections. These physical limitations are problematic for I/O transactions from both the system perspective and the I/O component perspective, since the structure of the physical devices participating in I/O transactions cannot always be made to match the logical device structure.

Consider the system perspective. Communication with the massively parallel computer is through a router input/output circuit, or "RIO" circuit, and associated IORAMs, as more fully described in U.S. patent application Ser. No. 07/802,944, filed Dec. 6, 1991, now U.S. Pat. No. 5,243,699, in the name of Nickolls et al. and entitled "Input/Output System for Parallel Processing Arrays," which is incorporated herein by reference. In an illustrative embodiment having 1024 router wires, for example, four separate boards are used, each having 256 signal connector pins and including a RIO circuit and associated IORAM. The use of four boards is dictated by practical considerations, including the difficulty under current technology of economically placing 1024 signal connector pins and associated circuitry on one board while adequately dissipating heat from the board. Nonetheless, the 1024 router wires distributed across four boards are in essence a single logical I/O device.

Consider the I/O component perspective. An example of an I/O component is the hard disk array, which is a cost effective alternative to a single high speed, high capacity hard disk. A disk array includes a number of relatively small capacity, relatively low speed disks, each typically providing a capacity of, for example, about 1.5 Gigabytes ("GB") and a data transfer rate of, for example, 3 Megabytes per second ("MB/s"). A disk array of eight disks thus has the capacity of about 11 GB and a transfer rate of about 24 MB/sec. Yet, even this performance is inadequate for high performance systems such as the massively parallel computer described in the aforementioned patent documents. Several distributed hard disk arrays behaving in essence like a single logical disk provide the desired greater capacity and speed.

The physical organization of an illustrative high speed input/output system 100 that includes the capability of programmably structuring various I/O devices into logical devices is shown in FIG. 1. The I/O system 100 includes two buses, an input/output channel (hereinafter "IOC") bus 110 and a conventional bus 190, implemented in the backplane (not shown). An I/O channel controller 120 implemented on a board, either a PCB or PCBA, is plugged into both buses 110 and 190. I/O to the high performance system, illustratively a massively parallel computer, is maintained through four I/O random access memory boards 130, 134, 136 and 138 plugged into the IOC bus 110. I/O devices associated with the high performance system include, illustratively, four disk arrays 130, 134, 136, and 138, each having its own board; a single board frame buffer 160; a single board high performance parallel interface ("HIPPI") 170; and a single board user defined device 180. Various processors, illustratively front end ("FE") processor 192 and I/O processor ("IOP") 194, are associated with the bus 190 for controlling the physical I/O devices 140, 144, 146, 148, 160, 170 and 180.

Each physical I/O device is interfaced to the IOC bus 110 by a channel interface circuit included on the board. For example, the IORAM device 130 comprises a channel interface circuit 131, an I/O random access memory buffer 132, and a router I/O ("RIO") circuit 133. The IORAM devices 134, 136 and 138 are similarly constituted. The disk array device 140 comprises a channel interface circuit 141 and a disk array 142. The disk array devices 144, 146 and 148 are similarly constituted. The frame buffer device 160 comprises a frame buffer circuit (not shown) and a channel interface circuit 161. The HIPPI device 170 comprises a HIPPI circuit (not shown) and a channel interface circuit 171. The user defined device 180 comprises a user defined circuit (not shown) and a channel interface circuit 181.

The I/O controller 120 comprises a transaction controller 126, which is interfaced to the IOC bus 110 through a channel interface circuit 124, and interfaced to the bus 190 through a bus interface circuit 128. The I/O controller 120 is clocked by IOC clock 122.

The bus 190 is any conventional bus wherein one device communicates with another by addressing the other device and transferring a word of data. Illustratively, bus 190 is a VME bus, and the bus I/O is a VME interface circuit. The disk arrays of the physical I/O devices 140, 144, 146 and 148, the frame buffer of the frame buffer physical I/O device 160, the HIPPI circuit of the HIPPI physical I/O device 170, and the user defined circuit of the user defined physical I/O device 180 are all connected to the bus 190 for the purpose of control and configuration, and not for the purpose of data transfer, as more fully explained below.

I/O Processor, or IOP, is a term used generically to refer to any processor on the bus 190 that requests I/O operations and services the status from the I/O operations. The Front End (FE) processor 192 is the high level controller which delegates various control functions, typically to a number of I/O processors. A representative I/O processor, IOP 194, is shown in FIG. 1.

The IOC bus 110 is an altogether different type of bus than the bus 190. In one illustrative embodiment, the IOC bus 110 is a 200 MegaByte/second bus suitable for high-speed transfers between various logical I/O devices. Physically, the IOC bus 110 comprises a data channel bus ("DCB"), which is the data path for the IOC bus 110; a control bus ("CB"), which comprises several individual lines for controlling and monitoring channel operations and a TYPE_CODE bus; and a clock line. Illustratively, the DCB comprises 64 data bits and 4 parity bits, one for each 16 bits of data, and the CB comprises 12 control/status lines, including 4 type code lines.

The IOC bus 110 supports IOC transactions, only one of which is active on the IOC bus 110 at any given time. Preferably, each IOC transaction is large, illustratively in excess of 128K bytes. IOC transactions occur between logical devices. For example, IORAM PCBAs 130, 134, 136 and 138 collectively serve as a single logical I/O buffer device between the processor element array of the massively parallel computer (not shown) and a high capacity, high speed logical device programmably configured from various physical devices on the IOC bus 110.

The capability of the system 100 to programmably designate one or more physical devices as one logical device and one or more physical devices as a second logical device, and then to control the transfer of data therebetween with little overhead, provides a powerful and versatile I/O system, capable of realizing high capacity, high speed logical devices and of sustaining high speed data transfer between them. The realization of logical devices involves a technique known as interleaving, or striping, which is illustrated in various aspects in FIGS. 2, 3 and 4.

Figure 2:
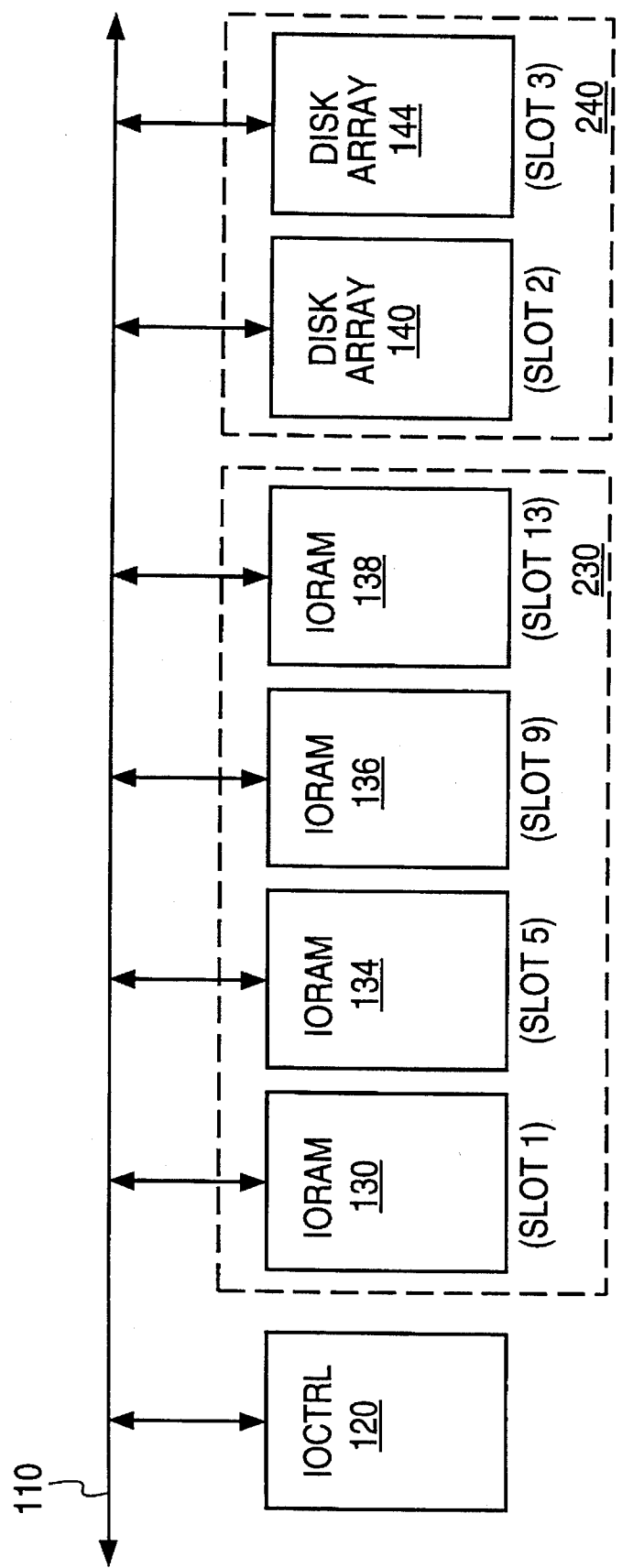
FIGS. 2, 3A, 3B and 4 are pictorial representations useful in explaining interleaving in the context of the input/output system of FIG. 1.

FIG. 2 shows, illustratively, a programmed arrangement in which the physical IORAM devices 130, 134, 136 138 are configured as a single logical IORAM device 230, and two physical disk array devices 140 and 144 are configured as a single logical disk device 240. The physical IORAM devices 130, 134, 136 and 138 are plugged into slots 1, 5, 9 and 13 of the backplane (not shown), and are programmably assigned leaf numbers 1, 2, 3 and 4 respectively, relative to the logical IORAM 230. The physical disk array devices 140 and 144 are plugged into slots 2 and 3 of the backplane (not shown), and are programmably assigned leaf numbers 1 and 2 respectively, relative to the logical disk 240. Note that each slot receives one board. The slot numbers are arbitrary.

Figure 3A:
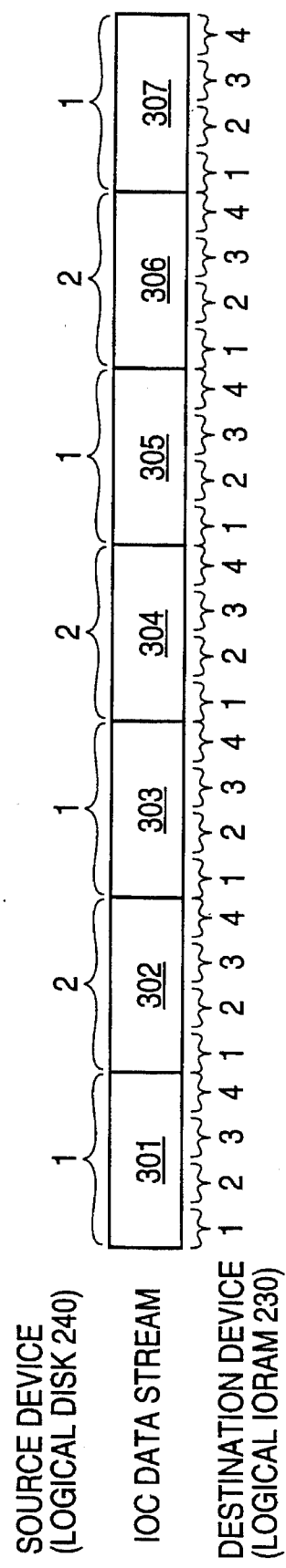

FIG. 3A shows a data stream perspective of FIG. 2. For visual clarity, blocks 301–307 represent groups of sixteen IOC normal data cycles. While either logical device 230 or 240 is capable of being a logical source device and the other a logical destination device, illustratively the logical disk device 240 is the source and the logical IORAM device 230 is the destination.

The source device, logical disk 240, is configured as a two way interleaved device, meaning that the two physical disk arrays 140 and 144 corresponding to, respectively, the first and second leaves of the logical disk 240 alternatively source data to the IOC bus 110 to maintain the IOC data stream. As shown in FIG. 3A, physical disk array 140 (leaf 1) bursts 16 normal data words (block 301); then physical disk array 144 (leaf 2) bursts 16 normal data words (block 302); then physical disk array 140 (leaf 1) bursts 16 normal data words (block 303); then physical disk array 144 (leaf 2) bursts 16 normal data words (block 304); then physical disk array 140 (leaf 1) bursts 16 normal data words (block 305); then physical disk array 144 (leaf 2) bursts 16 normal data words (block 306); and then physical disk array 140 (leaf 1) bursts 16 normal data words (block 307). Table 7 discussed below is an example of the various control words used in determining whether a particular physical device participates in sourcing data.

The destination device, logical IORAM 230, is configured differently than the logical disk 240. Logical IORAM 230, is configured as a four way interleaved device, meaning that the four physical IORAM devices 130, 134, 136 and 138, which correspond to respectively the 1, 2, 3 and 4 leaves of the logical IORAM 230, alternatively receive data from the IOC bus 110. As shown in FIG. 3, physical IORAM 130 (leaf 1) receives 4 normal data words (a first portion of block 301); then physical IORAM 134 (leaf 2) receives 4 normal data words (a second portion of block 301); then physical IORAM 136 (leaf 3) receives 4 normal data words (a third portion of block 301); then physical IORAM 138 (leaf 4) receives 4 normal data words (a fourth portion of block 301). This sequence is repeated throughout each of the data blocks 302, 303, 304, 305, 306 and 307 of the IOC data stream. Table 7 discussed below is an example of the various control words used in determining whether a particular physical device participates in receiving data.

In the illustrative FIG. 3A embodiment, the IOC bus 110 includes a data path of 64 bits, so that 64 bits of data are transferred in each IOC data cycle. The I/O data stream in FIG. 3 includes block 301, 302, 303,304, 305, 306 and 307 containing 1024 bits representing 16 IOC data cycles of 64 bits each. The destination logical device 230 comprising the physical IORAM devices 130, 134, 136 and 138 includes four RIO chips, as more fully explained in the aforementioned Nickolls et al. patent document entitled "Input/Output System for Parallel Processing Arrays," each yielding a RIO (e.g. RIO 133 in IORAM 130) and each including a RAM buffer memory (e.g. I/O buffer 132 in IORAM device 130) divided into four banks, each 64 bits wide. Hence, the logical IORAM 230 is obtained by configuring the physical IORAMs 130, 134, 136 and 138 with an interleave factor of four corresponding to the four boards, a burst count of four corresponding to the number of I/O data cycles for which a leaf is active, and the unique leaf identifiers of 1, 2, 3 and 4 assigned to physical IORAM devices 130, 134, 136 and 138 respectively. The source logical device comprises two physical disk array devices 140 and 144. The logical disk 240 is obtained by configuring the physical disk arrays 140 and 144 as follows: interleave factor is two, which corresponds to the two boards; the burst count is 16, which corresponds to the number of I/O data cycles for which a leaf is active; and the unique leaf identifiers of 1 and 2 are assigned to the physical disk array devices 140 and 144 respectively.

It will be appreciated that FIG. 3A shows a specific example simplified for clarity, in which the data transfer happens to start with the first leaf of the source device providing a full burst of 16 normal data words, and the destination device happen to participate with each of its four leaves receiving a full burst of 4 normal data words, beginning with its first leaf. In fact, the system 100 provides great flexibility in specifying how the logical source and destination devices are interleaved, and when and to what extent they participate in the IOC data transfer.

Figure 3B:
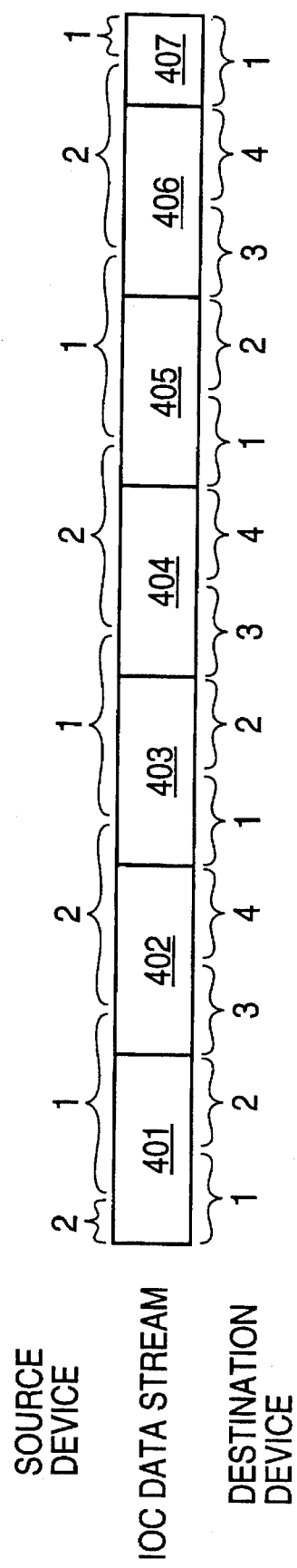

FIG. 3B shows a typical, albeit more complex, case of an IOC data transfer in which the second leaf of the source device starts the data transfer. Note that source leaf 2 supplies only 2 normal data words before source leaf 1 takes over, even though the burst count for the physical devices of the source logical device 240 is 16 normal data words. Also note that the word count is exhausted on a boundary that does not correspond to an event burst boundary for either the source device 240 or the destination device 230.

For specifying how the physical devices of a logical device are interleaved, the configurations of the physical devices are determined by three parameters: an interleave factor, a burst count, and a leaf identifier. The interleave factor defines how often a particular physical device participates in the data transfers. The burst count specifies the number of consecutive transfers for which the particular physical device is responsible when its interleave period arrives. The leaf identifier determines when the particular physical device participates, relative to the first IOC transfer. Upon receiving a logical device buffer address, a designated source or destination logical device begins to participate in the data transfer with a particular leaf and burst determined in accordance with a buffer address, and continues to participate until its interleaf word count is satisfied. Each IOC transaction involves a specific number of IOC words. In the FIG. 3A example, the IOC word count is 112. For the source logical device 240, the first leaf is specified to have an interleave word count of 64, and the second leaf is specified to have an interleave word count of 48. For the destination device 230, all four leaves are specified to have an interleave word count of 28. In the FIG. 3B example, the IOC word count is 99. For the source logical device 240, the first leaf is specified to have an interleave word count of 49, and the second leaf is specified to have an interleave word count of 50. For the destination device 230, the first leaf is specified to have an interleave word count of 27, while the second, third and fourth leaves are specified to have an interleave word count of 24.

Figure 4:
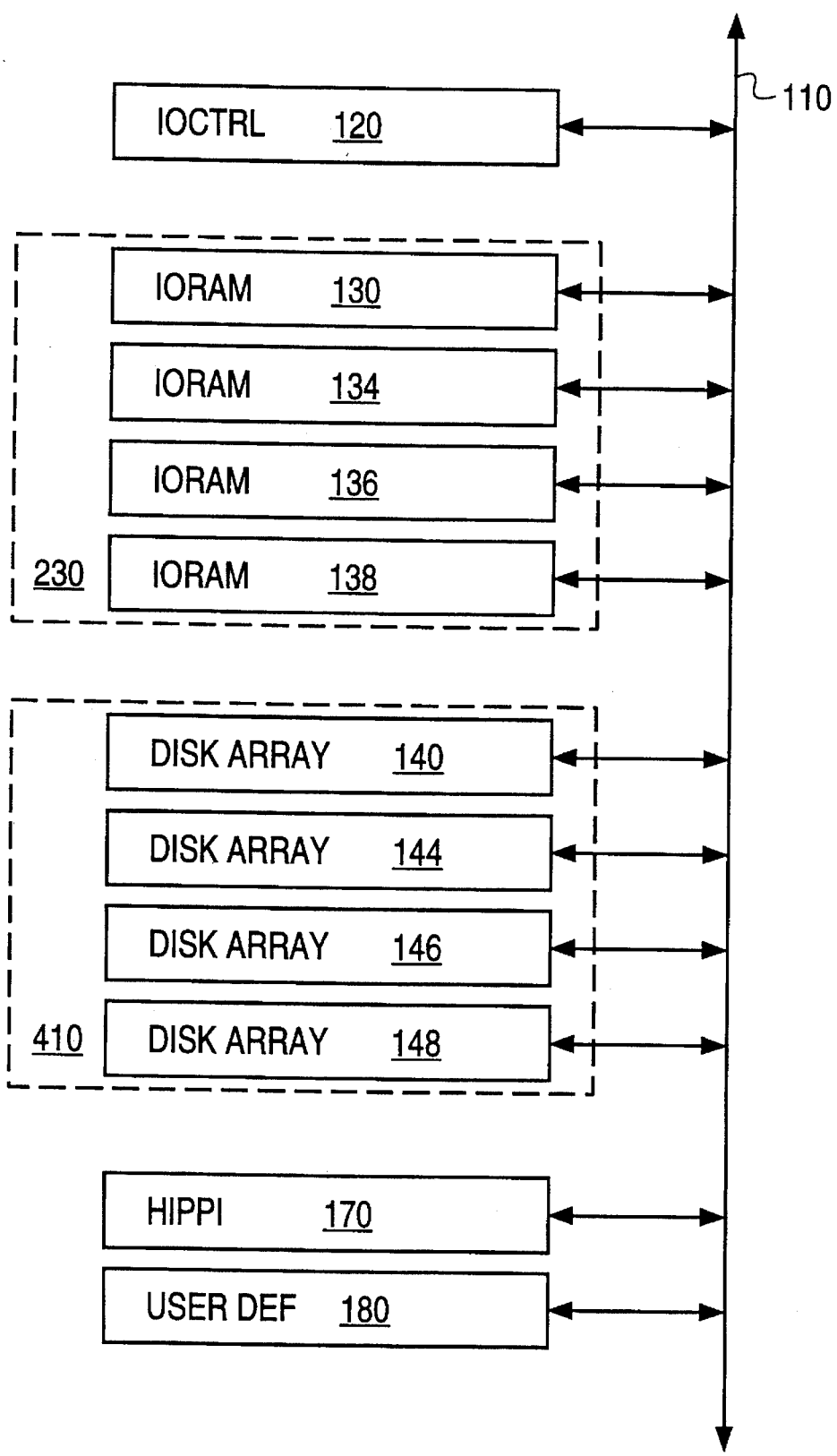

Because of the programmable property of the system 100, the configurations are changeable as required. For example, FIG. 4 shows the physical disk arrays 140, 144, 146 and 148 configured as a single logical device 410 with an interleave factor of 4. Advantageously, the physical disk arrays 140, 144, 146 and 148 are of like character, and high performance is achieved through a parallelism of like physical devices. Nonetheless, a logical device may include different types of physical devices. For example, two different disk arrays of different characteristics may be configured as a single logical device, if desired.

IOC Control Signals

FIGS. 3A and 3B shows data packets. Each IOC transaction includes, in addition to a data packet, a header packet. An IOC transaction is initiated when a header packet is broadcast onto the IOC bus 110. The header packet defines the type of transaction and any addressing required for the transaction. The data packet, which contains data conforming to the transaction type, is driven onto the IOC bus 110 by the device selected by the header packet, and received by the device selected by the header packet.

Each channel interface of the I/O system 100 has properties of both a physical device and a logical device. As a physical device, a channel interface is assigned a unique physical identification to allow each channel interface in the I/O system 100 to be physically distinguishable from every other channel interface in the I/O system 100. A logical device may comprise a plurality of physical devices, so that a plurality of channel interfaces in the I/O system 100 may share a common logical identification. Coordinated operation of several physical devices as one logical device is thereby accommodated.

When accessed as a physical device, a channel interface allows access between the IOC controller 120 and certain of its internal configuration registers and error status registers through the IOC bus 110. A channel interface to be configured is selected by a single control word header driven by the IOC controller 120, and is configured by the subsequent single transfer, read or write, of configuration data. Each channel interface is uniquely identified as a physical device.

The interleave factor, the burst count, and the leaf identification are all specified in the physical write operation. For example, assume it desirable to define two physical boards, each with its own channel interface, as one logical unit. Assume further that each board is capable of supplying two consecutive transfers, but requires one or two clocks to recover. For these boards, the interleave factor and the burst count is two, while one board would be assigned the leaf ID of zero, and the other board would be assigned the leaf ID of one. The starting buffer addresses to the user for interleaved devices and the total number of words that a particular interleaved device sources or sinks are also specified. The transfer of control from one physical channel interface to another during the interleave operation is transparent, and does not disturb the continuous stream of normal data words on the IOC bus 110. Multiple channel interfaces acting as a single logical device acknowledge each data transfer received.

When accessed as a logical device, a channel interface is set up to participate in a large block data transfer operation over the IOC bus 110. Data headers comprising a sequence of control words are transmitted over the IOC bus 110 to select the logical devices that will be the source and destination devices for the data transfer, a buffer or memory address within each logical device with which to begin the transfer, and a word count for the data portion. During the header portion, the I/O channel controller 120 monitors an acknowledge signal on the IOC bus 110 to determine if all header words are received. If a transmission occurs without a corresponding acknowledge, the I/O channel controller 120 terminates the transaction by driving an IOC error on an error monitor line of the IOC bus 110.

The act of driving the last control word on the IOC bus 110 initiates the data segment of the transaction, during which the source channel interface activates its bus drivers connected to the IOC bus 110 while the destination channel interface activates its receivers connected to the IOC bus 110. Each data word is acknowledged over an acknowledge line of the IOC bus 110 to indicate to the source device that the data was received. Because the acknowledge is pipelined, the source does not wait for an acknowledge signal for a particular data transfer before initiating an immediately subsequent data transfer. Nonetheless, the source does monitor the acknowledge signals, and asserts an IOC error if each data transfer is not acknowledged within the pipeline delay period.

The I/O channel controller 120 controls all channel transactions in the I/O system 100 by broadcasting header packets onto the IOC bus 110 to configure the logical devices, then initiates a transaction, and then gets off the IOC bus 110 until the transaction completes. The header packet includes signals communicated over the control lines of the IOC bus 110 in the form of several discrete signals and the type code. The control bus format is illustrated in FIG. 5A. Illustrative field names and descriptions are listed below in Table 1.

TABLE 1

| FIELD NAME | DESCRIPTION |
|---|---|
| IOC_ACK | IOC_ACK (IOC Transfer Acknowledge) is asserted by the destination in any transmission. It indicates to the source that the destination device did receive the data word. |
| IOC_ACTV | IOC-ACTV (IOC Transfer Active) is asserted by any Channel Interface ("CI") driving the IOC Data Channel. The CI driving IOC_ACTV deasserts the IOC_ACTV after it has received an IOC_ACK in response to the data driven onto the IOC bus 110. It does not have any association in time with IOC_DXFER, and therefore may or may not extend beyond IOC_DXFER. The I/O controller 120 uses both IOC_ACTV and IOC_DXFER to determine that the transaction is complete. |
| IOC_DXFER | IOC_DXFER (IOC Data Transfer) is asserted by selected destination devices (either logical or physical) when a Normal Data type code IOC cycle is expected. It remains asserted beyond the receipt of the Normal Data type code until the received data has been unloaded from the UI (user interface) side of the CI. It does not have any association in time with IOC_ACTV, and therefore may or may not extend beyond IOC_ACTV. The IOC Transaction Controller uses both IOC_ACTV and IOC_DXFER to determine that the transaction is complete. |
| IOC_ERR | IOC_ERR (IOC Bus Error) is asserted by devices on the IOC bus 110 to indicate that an unrecoverable IOC bus error has occurred. This class of errors will terminate the current transaction and require an external intervention to startup the IOC system 100 for further operations. It is assumed that this error is catastrophic in nature. Error is driven for a minimum of 1 IOC clock cycle. An error condition is cleared by an IOC_RST. Error information is not cleared during an IOC_RST and requires physical reads (TYPE_CODES=PR) to obtain error information, and physical writes (TYPE_CODE=PW) to clear and re-initialize error and status registers. |
| IOC_HERR | IOC_HERR (IOC Hard Error) is asserted by IORAM devices (e.g. IORAM 130) to indicate that a memory access to the RAM (e.g. RAM 132) by either the RIO (e.g. 133) or by the IOC bus 110 caused a non-correctable error to be detected. |
| IOC_SERR | IOC_SERR (IOC Soft Error) is asserted by a devices on the IOC to indicate that a soft, correctable error occurred during an access by either the RIO (e.g. RIO 133) or by the IOC bus 110. |
| IOC_RST | IOC_RST (IOC Reset) is asserted by the IOC Controller 120 to perform a hardware reset for all IOC device interfaces. |
| IOC_STALL | IOC_STALL (IOC Stall Request) is asserted by the destination device when it is no longer able to accept data. It asserts this signal at least two clocks before a data overrun would occur. The source then inserts the NOP Type Code as soon as possible (not to exceed two clocks) after the IOC_STALL has been asserted. The source continues to insert the NOP Type Code until the destination device deasserts Stall Request. Note that the source stall is accomplished by inserting NOP TYPE_CODEs. |
| TYPE_ | TYPE_PARITY is odd parity on the TYPE-CODE field. |
| TYPE_CODE | The TYPE_CODE field is a 4-bit control field. |

TABLE 1-continued

| FIELD NAME | DESCRIPTION |
|---|---|
| | Type codes are used to determine the type of data on the Data Channel portion of the IOC bus 110. They are asserted in parallel with each data word. |

Every bus cycle is distinguished by a four bit type code and one bit of parity. The type code defines the context of the information currently on the DCB (data channel bus). Various illustrative contexts are data, header words, and idle or no operations ("NOP"). Type codes are driven onto the IOC bus 110 by either the IOC controller 120 at the initiation of an IOC transaction, or by a device that is sourcing data to the IOC bus 110 during an IOC transaction. Illustrative type code definitions are listed below-in Table 2.

TABLE 2

| TYPE CODE | SYM-BOL | DEFINITION |
|---|---|---|
| 0 | NOP | NOP (No operation) defines no active device on the IOC channel 110, or the source device is stalling the transaction. |
| 1 | Reserved | |
| 2 | SDS | SDS (Source Device Select) defines an IOC cycle where the Data Channel contains the logical source device number. The source address is replicated into an upper and lower 32 bit halves of the DCB. |
| 3 | DDS | DDS (Destination Device Select) defines an IOC cycle where the Data Channel contains the logical destination device number. The destination address is replicated into an upper and lower 32 bit halves of the DCB. |
| 4 | SBA | SBA (Source Buffer Address) defines an IOC cycle where the Data Channel contains the lower order 32 bits of starting buffer or memory address on the Source Device for the data transfer. Note that this is a buffer address relative to the logical device, which may be multiple CIs configured as an interleaved device. The source buffer address is replicated into the upper and lower 32 bit halves of the DCB. |
| 5 | DBA | DBA (Destination Buffer Address) defines an IOC cycle where the Data Channel contains the lower order 32 bits of starting buffer or memory address on the Destination Device for the data transfer. Note that this is a buffer address relative to the logical device, which may be multiple CIs configured as an interleaved device. The destination buffer address is replicated into the upper and lower 32 bit halves of the DCB. |
| 6 | ESBA | ESBA (Extended Source Buffer Address) defines an IOC cycle where the Data Channel contains the upper order 32 bits of starting buffer or memory address on the Source Device for the data transfer. The source buffer address is replicated into the upper and lower 32 bit halves of the DCB. An illustrative IOC bus 110 protocol requirds the ESBA to be loaded once after a IOC_RST cycle, and is proceeded by a SBA IOC bus cycle. |
| 7 | EDBA | EDBA (Extended Destination Buffer Address) defines an IOC cycle where the Data Channel contains the upper order 32 bits of starting buffer or memory address on |

TABLE 2-continued

| TYPE CODE | SYMBOL | DEFINITION |
|---|---|---|
| | | the Destination Device for the data transfer. The destination buffer address is replicated into the upper and lower 32 bit halves of the DCB. An illustrative IOC bus 110 protocol requires the EDBA to be loaded once after a IOC_RST cycle, and is proceeded by a DBA IOC bus cycle. |
| 8 | PW | PW (Physical Write Select) defines an IOC cycle when the Data Channel contains a physical address that selects an I/O Board based on I/O back panel (backplane) slot number, a CI on the selected board, and a register within the selected CI. The Normal Data type code is used for the following data packet IOC cycle. The physical address and register select is replicated onto the upper and lower 32 bit halves of the DCB. This is because in one embodiment, the CI is implemented in two physical Channel Interface Logic ("ChIL") chips, and both participate when reading a CI status or configuration register. |
| 9 | PR | PR (Physical Read Select) defines a IOC cycle where the Data Channel contains a physical address that selects an I/O Board based on I/O back panel (backplane) slot number, a CI on the selected board, and a configuration or status register within the selected CI. The selected CI is expected to respond by driving the CB with a Normal Data type code and the DCB with the contents of the specified register. The physical address and register select is replicated into an upper and lower 32 bit halves of the DCB. This is because in one embodiment, the CI is implemented in two physical Channel Interface Logic ("ChIL") chips, and both participate when reading a CI status or configuration register. |
| A | WC | WC (Word Count) defines a IOC cycle where the Data Channel contains the number of IOC data words cycles for the following transfer. It also implicitly signals the selected Source Device to start the data transfer. The word count is replicated into an upper and lower 32 bit halves of the DCB. |
| B | LSEL | LSEL (Leaf Select) is used to select a specific CI within an interleaved logical device. It specifies a board and CI within the board for which interleave buffer address and interleave word counts are specified. It is followed in the header packet by an IBA (Interleave Buffer Address) and an IWC (Interleave Word Count); otherwise, the selected CI will assert IOC_ERR. |
| 2C | IBA | IBA (Interleave Buffer Address) is used to specify the starting buffer address within a specific leaf of an interleaved logical device. Note that this is specified for either an interleaved or non-interleaved logical device. For non-interleaved devices, the IBA matches the SBA (or DBA in the case of the destination), but for interleaved devices it is derived by system software for each IOC transfer. |
| D | IWC | IWC (Interleave Word Count) is used to specify the word count (how many times the IBA must be incremented) for an IOC data transfer within a specific leaf of an interleaved logical device. Note that this is specified for either an interleaved or non-interleaved logical device. For non-interleaved devices, the IWC will match the WC but for interleaved devices it is derived by system software for each IOC transfer. |
| E | PD | PD (Physical Diagnose) is a special physical read operation used to verify the Master ChIL chip operation by bouncing the results of the physical read from the Master Chil off of the IOC transceivers. Undefined results occur when a PD selects any non Master ChIL chip. |
| F | ND | ND (Normal Data) defines an IOC cycle where the Data Channel contains data. This is used for the data transfer packet of a IOC transaction. Word count is decremented once for every Normal Data cycle. |

The data driven onto the IOC bus 110 is in one of three formats: normal data format, physical access format, and configuration format. The format is identified by the TYPE_CODE on the control bus section of the IOC bus 110.

Normal data format is used for Normal Data type code or for specifying a buffer address on a source or destination device; TYPE_CODE=ND. Normal data format is illustrated in FIG. 5B.

Figure 5C:
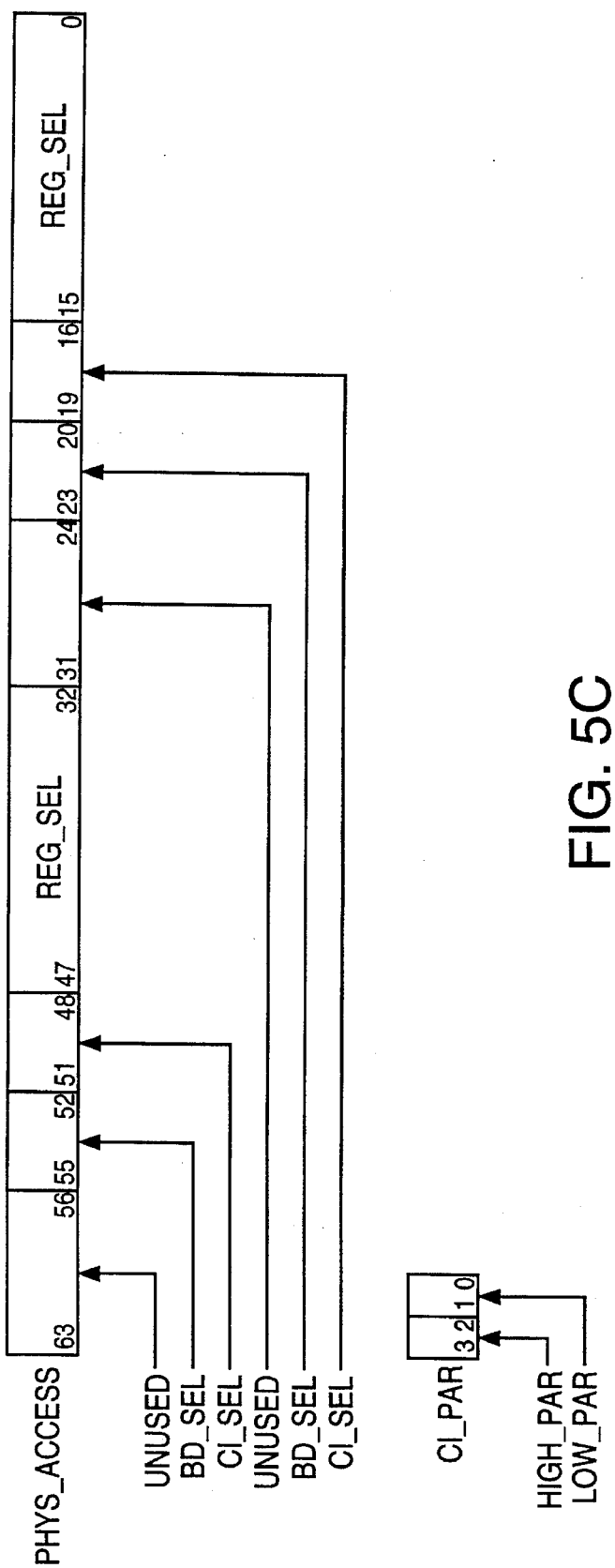

Physical access is used for physical reads and writes and for leaf selection; TYPE_CODE=PW, PR, PD, LSEL. The DCB assignments for the physical access format is illustrated in FIG. 5C, and the field names and descriptions are listed below in Table 3. Note that the DCB assignments are replicated and referred to as upper and lower sections. Note also that during leaf select (TYPE_CODE=LSEL), the upper and lower REG_SEL fields are not used and specified to be "don't care."

TABLE 3

| FIELD NAME | DESCRIPTION |
|---|---|
| HIGH_PAR <1:0> | HIGH_PAR <1> is odd parity across the DCB <63:48>. HIGH_PAR <0> is odd parity across the DCB <47:32>. |
| LOW_PAR <1:0> | LOW_PAR <1> is odd parity across the DCB <31:16>. LOW_PAR <0> is odd parity across the DCB <15:0>. |
| REG_SEL | REG_SEL is an 16 bit field that specifies a register within the CI. It is decoded within the CI. This field is not used when TYPE_CODE=LSEL. |
| CI_SEL | CI_SEL is an 4 bit field that specifies a CI on an I/O device. These are configured in hardware at the board level and art static. |
| BD_SEL | BD_SEL is a 4 bit field that selects an I/O device on the IOC. These are configured in hardware at the board level and are static. |

Figure 5D:
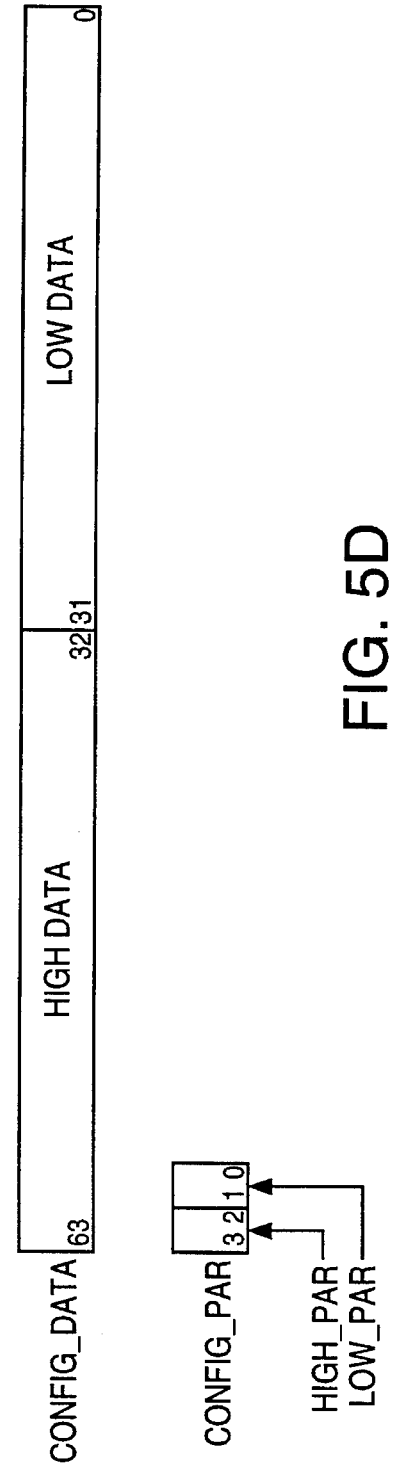

Configuration format is used when selecting a device, specifying the interleaved buffer address, interleaved word count, or the IOC word count; TYPE_CODE=ND, ESBA, EDBA, SDS, DDS, IBA, IWC, WC. The DCB assignments for the configuration format is illustrated in FIG. 5D, and the field names and descriptions are listed below in Table 4. Note that the DCB assignments are replicated and referred to as upper and lower sections.

TABLE 4

| FIELD NAME | DESCRIPTION |
|---|---|
| HIGH_PAR | HIGH_PAR is odd parity across the DCB <63:32>. |
| LOW_PAR | LOW_PAR is odd parity across the DCB <31:0>. |
| HIGH_DATA | HIGH_DATA contains configuration data and is replicated in LOW_DATA for the SDS, DDS and WC type codes. |
| LOW_DATA | LOW_DATA contains configuration data. |

Configuration and Data Transfer Operations

Physical access to each physical device is provided for a number of purposes, including to configure the physical device, to read its internal channel interface status, and to verify internal register contents for diagnostic purposes. A typical physical access includes the header that specifies the selection of source and destination devices, and the data transfer portion.

The header packet for a physical access specifies either a physical write of configuration data to a particular register of a selected channel interface, or a physical read of the contents of a particular register of a selected channel interface using the PW or PR type codes respectively. These type codes cause the selection of a physical slot on the IOC bus 110 and a channel interface on the selected PCBA. After a particular channel interface is selected, a physical write (TYPE_CODE=PW) occurs when the I/O controller 120 drives a normal data (ND) type code with the data to be written into certain registers of the selected channel interface, including a logical device designation (see ldev register 941 in FIG. 9B), an interleaf value IVAL (see ival register 942 in FIG. 9B), and an interleave mask value IMASK (see imask register 943 in FIG. 9B). Between the selection of the channel interface and the assertion of the data, NOP cycles may be inserted by the I/O controller 120. A physical read (TYPE_CODE=PR) occurs when the selected channel interface asserts a normal data (ND) type code and drives the contents of the specified register onto the IOC bus 110. Between the selection of the channel interface and the assertion of the data, NOP cycles may be inserted by the channel interface.

Once the physical devices on the IOC bus 110 are configured, data transfer transactions occur. A typical data transfer transaction begins with a header that specifies the selection of source and destination logical devices, buffer addresses from which to begin the transfer for the logical devices and the physical devices, word counts for the logical devices, and a word count that specifies the number of IOC data cycles for the transfer. The data portion follows the header portion. An illustrative header packet and data portion for a data transfer between non-interleaved devices is listed in Table 5, while an illustrative header packet and data portion for a data transfer between a two-way interleaved device and a non-interleaved device is listed in Table 6.

TABLE 5

| TYPE CODE | DATA CHANNEL BUS |
|---|---|
| SDS | Selects the logical source device. |
| SBA | Specifies the logical device buffer address for the source device. |
| LSEL | selects a single CI channel interface of the selected logical source drive. |
| IBA | Specifies the buffer address for the channel interface selected in LSEL. |
| IWC | Specifies the word count for the channel interface selected in LSEL. |
| DDS | Selects the logical destination device. |
| DBA | Specifies the logical device buffer address for the destination. |
| LSEL | Selects a single channel interface of the selected logic destination drive. |
| IBA | Specifies the buffer address for the channel interface selected in LSEL. |
| IWC | Specifies the word count for the channel interface selected in LSEL. |
| WC | Specifies the number of IOC bus 110 words to be transferred and signals the source device to start the data transfer portion. |
| ND | First data (number of IOC word transfers = 1) |
| : | : |
| ND | Last data (number of IOC word transfers = WC) |

TABLE 6

| TYPE CODE | DATA CHANNEL BUS |
|---|---|
| SDS | Selects the logical source device. |
| SBA | Specifies the logical device buffer address for the source device. |
| LSEL | Selects the first leaf of the source so that IBA and IWC can be specified. |
| IBA | Specifies the buffer address for the selected leaf (CI). |
| IWC | Specifies the word court for the selected leaf (CI). |
| LSEL | Selects the second leaf of the source so that IBA and IWC can be specified. |
| IBA | Specifies the buffer address for the selected leaf (CI). |
| IWC | Specifies the word court for the selected leaf (CI). |
| DDS | Selects the logical destination device. |
| BDA | Specifies the logical device buffer address for the destination. |
| LSEL | Selects a CI of the destination so that IBA and IWC can be specified. |
| IBA | Specifies the buffer address for the selected CI. |
| IWC | Specifies the word court for the selected CI. |
| WC | Specifies the number of IOC words to be transferred and signals the source device to start the data transfer portion. |
| ND | First data (number of IOC word transfers = 1) |
| : | : |
| ND | Last data (number of IOC word transfers = WC) |

Note that the selection of the source buffer address is preceded by the selection of the source device, and the selection of the destination buffer address is proceeded with the selection of the destination device. The selection of the source and destination device are independent and can be specified in either order. The word count is the last header word.

Protocol violations in the header packet specification, as opposed to sourcing or sinking the wrong buffer address, forces the assertion of IOC_ERR either during a bus timeout or no acknowledge.

In one illustrative embodiment, data transfers are restricted to a 4 Gigabyte space. This allows the upper order 32 bits of buffer address to be specified only once after an IOC_RST, and all subsequent data transfers within the same 4 Gigabyte page need specify only the lower order 32 bits of buffer address. Hence, a SBA (Source Buffer Address) type code following a SDS (Source Device Select) type code causes the source to latch the content of the DC (Data Channel) of the IOC bus 110 combined with the previously latched upper order 32 bits of buffer address, and use this as a pointer to the starting buffer or memory address for sourcing data. Similarly, a DBA (Destination Buffer Address) type code following a DDS (Destination Device Select) type code causes the destination to latch the content of the DC (data channel) of the IOC bus 110 combined with the previously latched upper order 32 bits of buffer address, and use this as a pointer to the starting buffer or memory address for receiving data. Note that SBA and DBA specify the logical device buffer address as would be viewed by a programmer. When specifying the full 64 bit buffer address, the extended buffer address type codes EDBA and ESBA precede the standard buffer address type codes SBA and DBA.

Specifying the word count is accomplished by using the IWC and WC type codes. Each physical device of the selected source and destination logical devices latches its respective IWC into a counter that is decremented on every Normal Data transfer cycle on the IOC bus 110. The specification of WC is used to verify proper completion of the transaction and also has an IOC start function, informing the source to start the data transfer on the IOC bus 110.

Once the IOC word count has been specified, the appropriate source physical device begins to transfer data. Since the source's word count is not equal to zero, it drives IOC_ACTV, indicating that the IOC bus 110 is being driven. As data is read from the source's internal buffer and driven out onto the DCB portion of the IOC bus 110, it is received by the appropriate destination physical device. The destination latches the data into a FIFO or some other type of input buffer, and generates an acknowledge. Typically, the IOC_ACK will be driven constantly for continuous uninterrupted data transfers. The destination also drives IOC_DXFER whenever the channel interface is not empty. As the data is read out of the destination channel interface, it is written into the destination's internal buffer or memory.

During a data transfer, either the source or the destination can stall the data transfer. The source can stall the transfer of data by driving a NOP type code. The destination can stall the transfer of data by driving the Stall Request (IOC_STALL). The source responds to the destination's stall request by inserting NOP type codes within 2 IOC bus 110 cycles.

Both source and destination stalls interrupt the IOC_ACK being driven. Preferably, the input buffer includes at least two extra buffer locations to buffer the additional IOC data transfers that occur after the destination device has driven Stall Request (IOC_STALL).

Input/Output Channel Transaction Controller

Figure 6A:
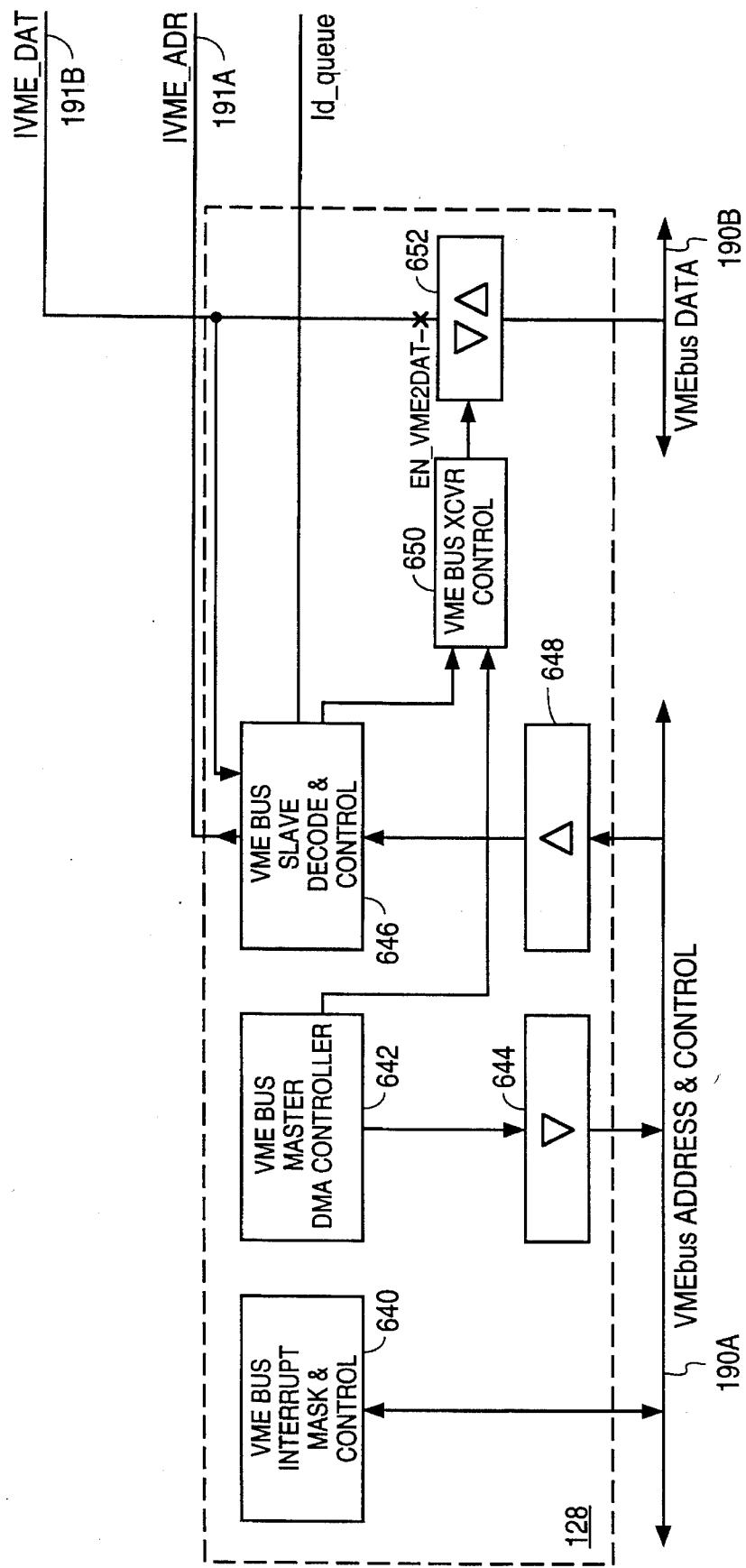
FIGS. 6A and 6B are contiguous sections of a block schematic diagram of an input/output channel controller.
Figure 6B:
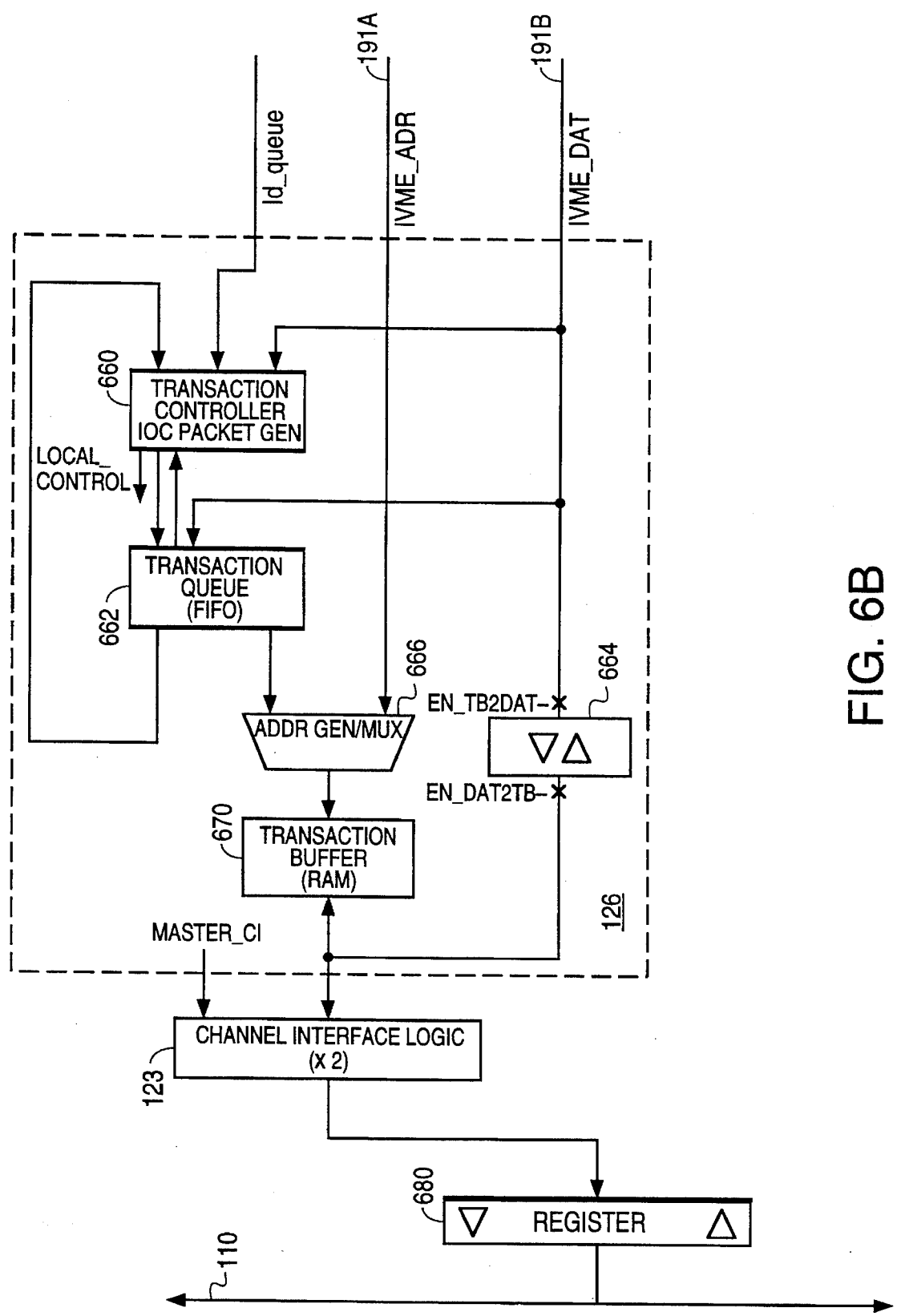

The IOC controller 120 is shown in block diagram form in FIGS. 6A and 6B. The channel interface 124 is implemented as a set of two channel interface logic ("ChIL") chips, connected on the bus side to the IOC bus 110 through a bus interface transceiver ("BIX") register 680. The user interface side of the channel interface 124 is connected to the bidirectional data port of a transaction buffer 670 in the transaction controller 126. The transaction buffer 670 receives data either from the IOC bus 110 through the channel interface 124, or from the VME data bus 190B through bidirectional gate 652 and via the internal VME data ("IVME_DAT") bus 191B through bidirectional gate 664. When enabled by signal EN_IDAT2TB, bidirectional gate 664 provides data from IVME_DAT bus 191B to the data port of the transaction buffer 670; and when enabled by signal EN_TB2IDAT, bidirectional gate 664 provides the data output from the transaction buffer 670 to IVME_DAT bus 191B. The transaction buffer 670 is addressed by address generator-multiplexer 666, which selects either the internal VME address ("IVME_ADR") bus 191A from the VME interface 128 or the output of a transaction queue 662. Packet generator 660 both reads from and writes to the transaction queue 662, which is also capable of being written from IVME_DAT bus 191B from the VME interface 128. An input of the packet generator 660 is connected to the IVME_DAT bus 191B from the VME interface 128.

Illustratively, the VME bus interface 128 includes a VME master DMA controller 642, which provides address and control information to the VME bus address and control portion 190A through gate 644, and also includes a VME slave decode and control 646, which receives address and control information from the VME bus address and control portion 190A through gate 648. Outputs of the VME master DMA controller 642 and of the VME slave decode and control 646 are connected to inputs of the VME bus transceiver control 650, which controls operation of the bidirectional gate 652. One side of the bidirectional gate 652 is connected to the VME bus data portion 190B, and the other side is connected to IVME_DAT bus 191B. An interrupt mask and control circuit 640 is also connected to the VME bus address and control portion 190A.

The I/O controller 120 functions as a centralized controller for transactions on the IOC bus 110, generating the clocks for the I/O subsystem, serving as the sole initiator of IOC transactions, and acting as the VME interface for the IORAM PCBAs 130, 134, 136, and 138. The I/O controller 120 is a slave to the I/O processors such as IOP 194 in the I/O system 100, to which it is connected by the bus 190 (FIG. 1). An I/O processor starts an IOC transaction by writing a control block into the transaction buffer 670, then pushing a pointer to the block onto the transaction queue 662. When the pointer is pulled out of the queue by the address generator/multiplexer 666 and no IOC transaction is active on the IOC bus 110, the control block pointed to by the output of the transaction queue 662 is read out of the transaction buffer 670 and transmitted verbatim onto the IOC bus 110 through the registers 680. The contents of the control block is understood by a source logical device and a destination logical device, which respond by transferring data.

Once an IOC transaction is initiated, it continues without interruption until it completes, has an error, or experiences a time out. The I/O controller 120 monitors all three conditions. For a time out, the time from the last bus cycle is measured. The IOC bus 110 error (IOC_ERR) line is asserted if a time-out occurs. Once an error is detected, the I/O controller 120 drives the IOC bus 110 reset (IOC_RST) signal, forcing all parties to relinquish the bus. The error is then passed to the bus 190 in the form of an interrupt (if enabled) and a status bit in a control status register, or "CSR." Successful completion also sends back status to the bus 190 in a like manner.

The IOC Transaction Queue and Transaction Controller

As shown in FIG. 6B, the IOC transaction queue 662 resides in the transaction controller 126 on the I/O controller 120 PCBA. The IOC transaction queue 662 is responsible for accepting IOC requests from I/O processors, and is the single point of control for IOC transactions. All requests to use the IOC bus 110 are processed through the IOC transaction queue 662.

Each request from an I/O processor causes a single IOC transaction to be generated. An IOC transaction includes a header portion and a data portion. Each request also causes a VMEbus Interrupt to be generated, if the interrupt is enabled, at the completion of the IOC transaction. I/O requests are executed in the order queued, and is in one of four states once it is queued: pending, executing, completed, or retired. Pending status means that a pending request has been queued but has not been read by the transaction controller 126. Executing status means that an executing request has been read by the transaction controller 126, and is currently using the IOC bus 110. Either the header portion or the data portion of the transaction is active. Completed status means that a completed request is no longer using the IOC bus 110 and the status word has been written into the transaction buffer 670. Retired status means that a retired request has been queued into the VME bus mask and control 640, freeing up the transaction controller 126 to process another request.

The IOC transaction queue 662 provides for two functional advantages. The IOC queue 662 allows I/O processors to execute I/O operations as background processes, with each request generating an interrupt to the requesting I/O processor upon completion. The IOC transaction queue 662 also supports multiple I/O processors, so that I/O processors are able to make independent I/O requests without knowledge of other I/O processors.

An I/O processor generates an IOC request by performing several VMEbus write operations to a transaction buffer 670. These specify the header portion, and not the data portion, of an IOC transaction. An address is provided to the transaction buffer 670 through the address multiplexer 666 by the VME slave decode and control circuit 646 in the VME I/O interface 128, from address data furnished on the VME bus address and control portion 190A by the requesting I/O processor and gated to the circuit 646 through gate 648. Header data is provided to the transaction buffer 670 from data furnished on the VMEbus data portion 190B by the requesting I/O processor and gated through gates 664 and 652. After the requesting I/O processor writes a complete header to the transaction buffer 670, which typically requires several VME bus cycles, it performs a single VMEbus write to the transaction queue 662, a first-in first-out ("FIFO") queue, through the gate 652. This single write makes the I/O request available for processing.

The feature of a single write operation to the transaction queue 662 enables independent I/O processors to build up complete headers in different areas of the transaction buffer 670 buy using multiple non-interlocked VME bus transactions. Each entry in the transaction queue 662 is an index pointer into the transaction buffer 670 that points to the first header word of a transaction stored in the particular area of memory. Internal control logic in the address generator and multiplexer 666 increments the pointer into the transaction buffer 670 during an IOC transaction, driving the header, including type codes, onto the IOC bus 110 until the header portion of the transaction is complete. Other internal logic in the transaction controller IOC packet generator 660 gates and monitors the data portion of the IOC transaction until this completes. Once it has completed, the status is written into the transaction buffer 670 where it is accessible to the requesting I/O processor through gates 664 and 652. Finally, a VMEbus interrupt is generated if it was specified by the requesting I/O processor at the time the request was generated.

The operation of the transaction buffer 670 and the transaction queue 662 is shown in greater detail in FIG. 7. A transaction queue 710 is a functional representation of the transaction queue 662, while a transaction buffer 720 is a functional representation of the transaction buffer 670. Transaction queue 710 illustratively queues up to 64 IOC requests. Likewise, the transaction buffer 720 illustratively holds up to 64 unique IOC headers.

Generating an I/O request involves (a) writing each word of the IOC header packet X, e.g. $X_1, X_2, \ldots X_n$, into the transaction buffer 720 (step 750), which could require several VME bus cycles; and (b) when assembly of the IOC header packet is completed, writing a pointer ADR_X into the transaction queue 710 that points to the start of the header packet X in the transaction buffer 720 (step 752). A third structure (not shown) maintains a list of unserviced VMEbus interrupts. This structure allows IOC transactions to be retired asynchronously with respect to the servicing of VMEbus interrupts for previously completed transactions.

The IOC header packet is written by performing several VMEbus write operations to the transaction buffer 720. The transaction buffer 720 is a VME-mapped random access memory with address blocks dedicated to each one of the 64 possible queue entries. Each entry in a block, e.g. entries $X_1, X_2, \ldots X_n$ in block X, contains the data or control information that is used to generate one bus cycle on the IOC bus 110. The group of data or control words associated with one IOC request is referred to as a Q-block. Illustratively, the transaction buffer 720 is organized in sixty-five Q-blocks, one of which is dedicated to system diagnostics and the other sixty-four of which are used for input and output processing.

Each Q-block is divided into smaller blocks that are used to drive the IOC bus 110 for a single bus cycle. These smaller blocks are called "header words" or "Q-block entries." Illustratively, queue block 722 shows a header word having 64 bits of data that are used to drive the 64-bit-wide DCB (data channel bus) of the IOC bus 110, four bits of data used to drive the 4-bit-wide TYPE_CODE bus of the CB (control bus) IOC bus 110, and a bit end_IOP used by internal control logic to indicate the last word to be driven onto the IOC bus 110 within the Q-block.

The process of generating a single header word uses three VMEbus write cycles. The first half of the 64 bits of data used to drive the 64 bit wide DCB is written in the first VMEbus cycle. The second half of the 64 bits of data used to drive the 64 bit wide DCB is written in the second VMEbus cycle. The type code is written in the third VMEbus cycle.

Q-blocks are allocated to I/O processors by system software, which allocates and de-allocates Q-blocks on a demand basis.

Generating the request to process the header packet is accomplished by performing a single VMEbus write operation to the transaction queue 710. This single VMEbus write operation indicates the I/O request is ready to be processed. The queued request is used by internal control logic to select a Q-block. Each entry of the transaction queue 710 contains an index pointer into the transaction buffer 720. For example, the entry ADR_X in the transaction queue 710 is an address of the first header packet of the Q-block X in the transaction buffer 720.

I/O processors have two ways to determine if a transaction has completed. One way (step 754) is to poll a status word in the Q-block associated with a particular request, e.g.

status word X in Q-block 722, after it has generated the request to detect the setting of a "completed" bit in the status word, e.g. complete bit 724 in the status word X of Q-block 722. The second method to determine transaction completion (alternative step 756) uses a bit in the transaction queue associated with each I/O request that indicates whether an interrupt should be generated. This bit, GEN_INT bit 712 in the pointer ADR_X of the transaction queue 710, is specified if the second transaction completion determination technique is used, and is not specified if the first transaction completion determination technique is used. An interrupt level variable 714 in the pointer ADR_X of the transaction queue 710, which illustratively is two bits, determines the VMEbus interrupt level on which the interrupt should be generated. A vector variable 716 is associated with each interrupt level variable, e.g. vector 716 in the pointer ADR_X of the transaction queue 710. IOC queue interrupt logic (not shown) maintains a list of unserviced VMEbus interrupts for each of 4 possible VMEbus interrupt levels. When an interrupt is generated at that level, an interrupt acknowledge cycle is performed on the VME bus 190 to obtain the appropriate vector, e.g. vector 716. Interrupt levels are allocated to individual I/O processors by system software.

The IOC queue interrupt and status logic stacks a single pending interrupt per VMEbus interrupt level. A new IOC request will be processed (completed) but not retired until any previous request that was specified at the same interrupt level is acknowledged. If the request was not specified to generate an interrupt, that it will be processed and retired without regard to outstanding interrupts.

To provide for IOC transactions between logical devices (typical I/O data transfers), Q-blocks contain all of the data to generate the header packet associated with a single IOC packet. Illustratively, the number of header words in a header packet ranges from five to sixty-three. The header is read out of the transaction buffer 720 one header word at a time and driven onto the IOC bus 110. For example, Q-block 722 contains "n" header words. When ADR_X is read from the FIFO transaction queue 710 (step 758), the header words $X_1, X_2, \ldots X_n$ are read out and driven onto the IOC bus 110 one at a time (step 760). The last header word to be driven out onto the IOC will have the end_IOP bit set in the transaction buffer 720. This indicates to the transaction controller circuit 660 that it is the last header word in the header. At the completion of the IOC transaction, transaction status is written into the dedicated Q-block entry indicating completion status (step 762).

Figures 1, 8A:
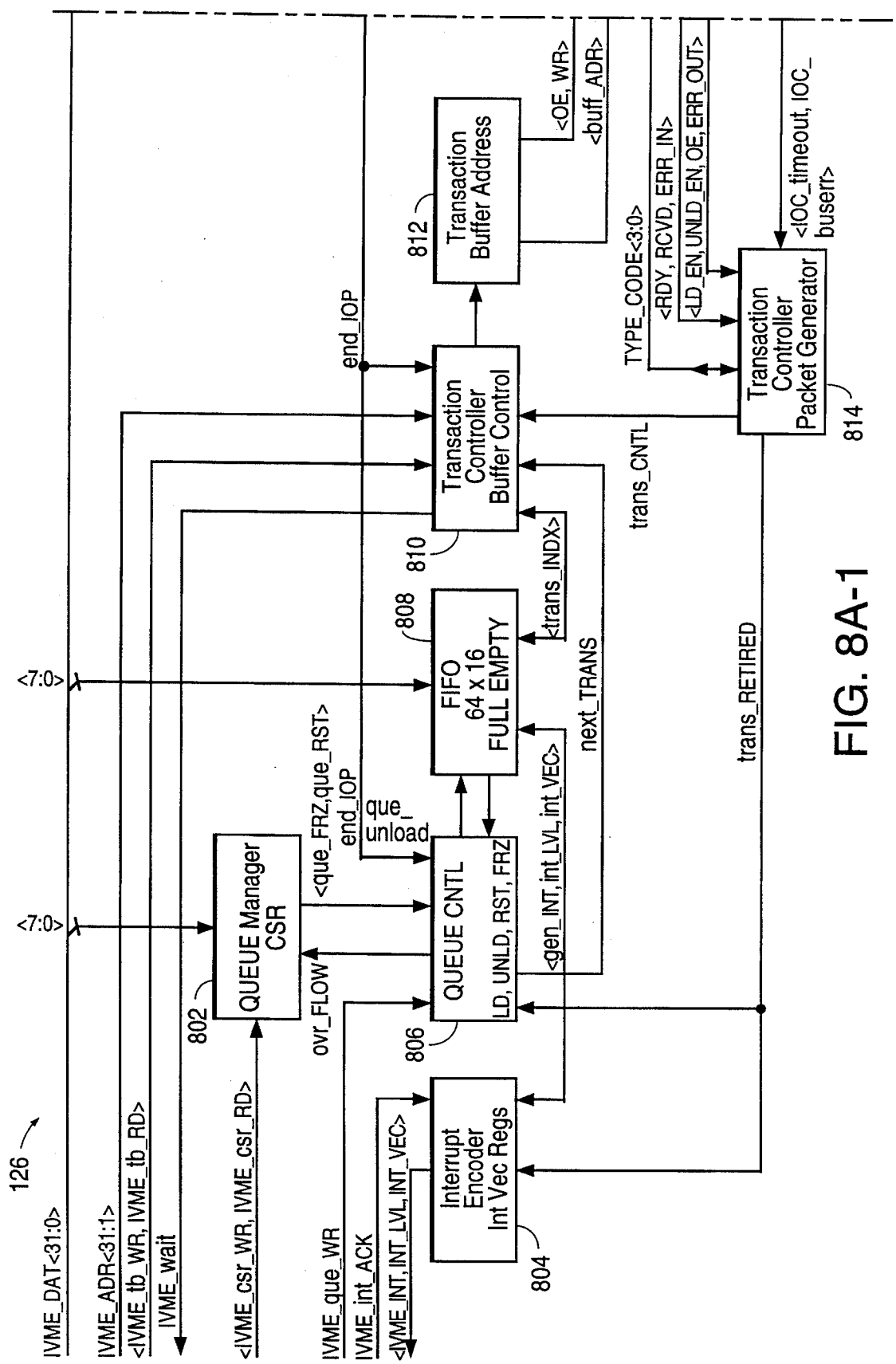

An IOC transaction is enveloped by the first header word, through the deassertion of IOC_ACTV and IOC_DXFER. The bus monitor 816 (FIG. 8A) is responsible for determining this envelope.

The Q-blocks for physical IOC transactions contain, as for logical IOC transactions, the header data for a single IOC transaction. In the case of physical write operations which are used to configure channel interfaces on the IOC bus 110, only two header words are driven onto the IOC bus 110. The first header word selects the physical device, and the second header word contains the data to be written into the device. In the case of physical read operations, only one header word is driven on the IOC bus 110. This header word selects the physical device, and the selected channel interface drives the configuration data onto the IOC bus 110. The configuration data is captured by the I/O controller 120, where it is written into the Q-block status word associated with the transaction for inspection by the I/O processor later. Since the read data is stored in the Q-block status word in the transaction buffer 720, only one physical read is permitted per transaction.

Figure 8B:
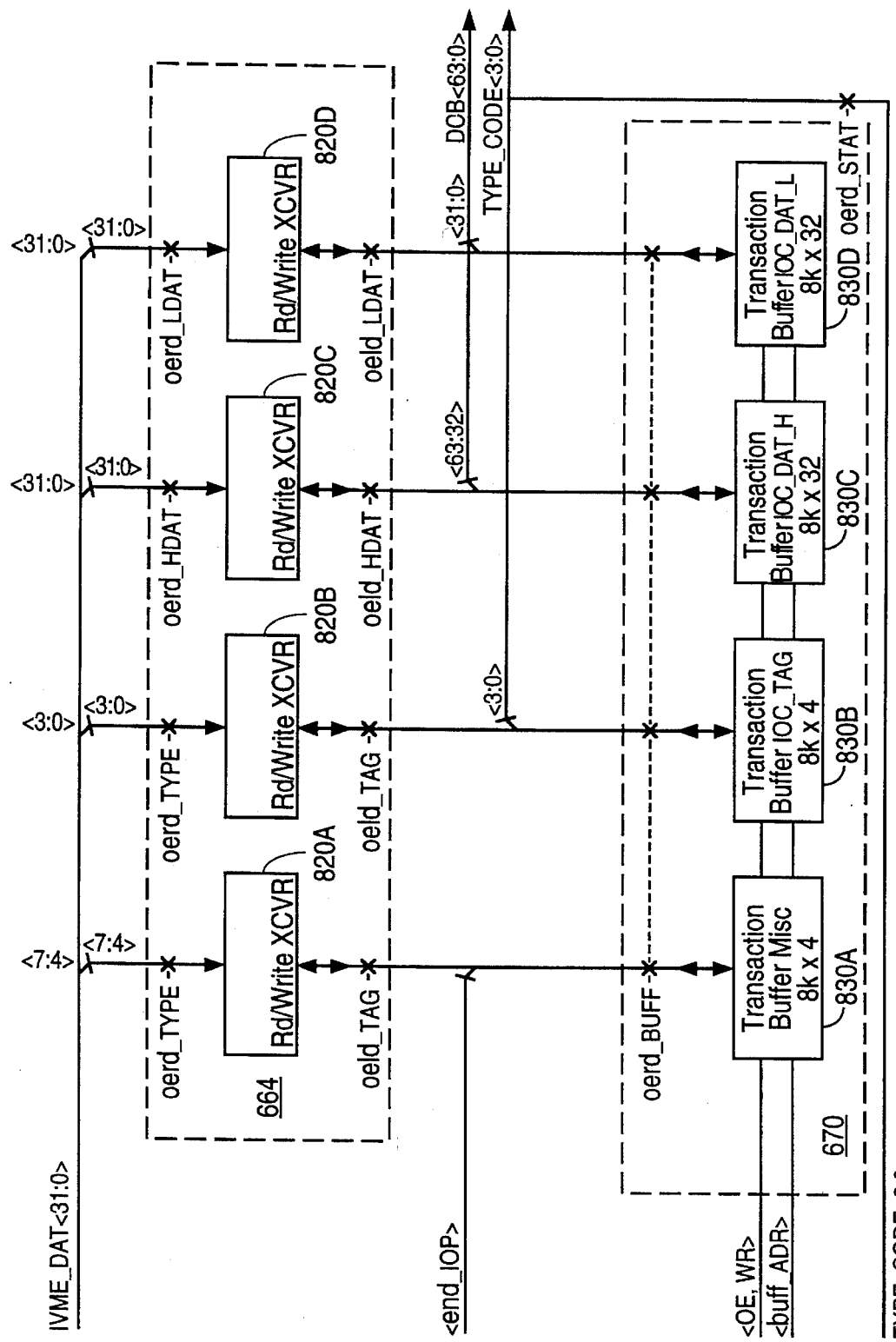

The I/O controller 126 is shown in further detail in FIG. 8. Queue manager control status register ("CSR") 802 is a VMEbus slave addressable hardware register connected to IVME_DAT<31:0> (the internal VME DATA bus from the VME interface 128) and CSR read write control lines <IVME_csr_WR, IVME_csr_RD>. The Queue Manager CSR 802 provides control functions to the transaction queue 808, such as queue reset que_RST, queue freeze que_FRZ, and an IOC master reset bit that is driven onto the IOC bus 110 as IOC_RST (not shown) to reset the various channel interfaces. The queue manager CSR 802 also includes various status bits that allow the internal control states of the transaction queue 808, the transaction buffer 830 (FIG. 8B), and the IOC bus 110 (signals que_FRZ, que_RST, and ovr_FLOW) to be examined by the IOPs on the bus 190 through queue control logic 806.

Queue control logic 806 controls the operation of transaction queue 808. The queue control logic 806 generates control and timing signals for writes to the transaction queue 808 and the transaction buffer control logic 810 when accessing the transaction queue 808. IOC requests are written into the transaction queue 808 from IVME_DAT<31:0> upon an assertion of IVME_que_WR. Read, or unload, commands are provided from the queue control logic 806 to the transaction queue 808. The transaction queue 808 is capable of being frozen by the queue control logic 806 in response to <que_FRZ> so that all entries that have not been selected will not be executed, i.e. processed onto the IOC bus 110. Unfreezing the transaction queue 808 using the same mechanism allows the I/O controller 120 to resume processing entries.

The transaction queue 808 is a first-in, first-out ("FIFO") memory written by I/O processors performing VMEbus 190 write operations, and read by the buffer control 110 to initiate an IOC transaction on the IOC bus 110. For write operations from the VME bus interface 128, the transaction queue 808 is mapped as a 32-bit VMEbus addressable register. Each write generates a new IOC transaction queue entry that corresponds to one IOC request. A single VMEbus write operation into the transaction queue 808 from IVME_DAT<31:0> deposits four fields: (a) a transaction buffer index field trans_INDX that is used to generate an address of the first header word for a new transaction in the transaction buffer 830; (b) a VMEbus interrupt vector bit gen_INT to indicate whether a VMEbus Interrupt should be generated at the completion or termination of the IOC transaction; (c) an interrupt level field int_LVL; and (d) an interrupt vector field int_VEC. As a result of a write to the transaction queue 806, one of four possible states is realized: either the Empty Status becomes true, or the Empty Status goes false, or the Queue Full Status becomes true, or the Queue overflow Status becomes true.

For read operations by the transaction buffer control logic 810, the oldest IOC request, the Top of Queue, is processed first as the IOC bus 110 becomes available. Each entry in the transaction queue 808 contains the trans_INDX, gen_INT, int_LVL, and int_VEC fields. Signals <gen_INT, int_LVL, int_VEC> are written into interrupt encoder and interrupt vector registers 804, from which they are available to the VME bus I/O interface 128. Queue data trans_INDX is read by the transaction buffer control logic 810 to initiate an IOC transaction. The Top of Queue is not unloaded until the initiated IOC transaction is retired, as signaled by trans_RETIRED from a packet generator 814.

When a transaction completes, a VMEbus interrupt is generated if the interrupt bit (GEN_INT) in the transaction queue 806 for that transaction is set and the board level global request is enabled. The interrupt level field int_LVL and the interrupt vector field int_VEC are used by queue interrupt logic 804 to generate interrupts at the specified VMEbus interrupt level, and supply INT_LVL and INT_VEC as the VME bus 190 interrupt level and vector when the interrupt is serviced. As queue entries are used, the gen_INT, int_VEC, and int_LVL fields are latched into an interrupt priority encoder queue in the queue interrupt logic 804, where they are processed.

The queue control logic 806 is not required to arbitrate between VME bus 190 reads and writes. This is because the transaction queue 808 is implemented as a FIFO with dedicated input and output data paths. Once the queue control logic 806 detects a non-empty queue condition, the transaction buffer control logic 810 latches the index trans_INDX off of the top of the transaction queue 808, and the interrupt encoder latches gen_INT, int_LVL, and int_VEC off of the top of the transaction queue 808. After the transaction completes and the queue interrupt logic 804 is able to accept the request to generate a VMEbus interrupt, the queue control logic 806 unloads the retired request. If the transaction queue 808 is still not empty, another transaction Can be started. If the transaction queue 808 is full and the VME Interface tries to perform a write operation, the queue overflow status bit ovr_FLOW and the queue freeze bit que_FRZ are set in the queue manager CSR 802 and a VMEbus Interrupt is generated. Since system software allocates Q-blocks and each IOP knows whether its allocated Q-blocks are being used, the error ovr_FLOW should not happen and is considered catastrophic.

The transaction buffer control logic 810 and the transaction buffer address logic 812 perform address generation, write enable generation, and output enable generation for the transaction buffer 830 to cause the loading of an IOC header into the channel interface 124. The transaction buffer control logic 810 latches the trans_INDX output of the transaction queue 808 when it detects (a) the Not Empty Status flag indicating that an IOC request is ready to be processed; and (b) the Q_FRZ flag not true, indicating that the transaction queue 808 is available to be read; and that (c) an IOC transaction is not currently executing by having been retired to the queue interrupt encoder 804. The transaction buffer address logic 812 furnishes address <buff_ADR> specified by the pointer next_TRANS to the transaction buffer 830, drives active either the output enable signal OE or the write enable signal WR, and increments the address in the transaction buffer address logic 812 until it encounters an END_IOP bit set in the transaction buffer 830.

Signal trans_INDX provides the base address for one of the 64 Q-blocks. The address to the transaction buffer 830 is generated in the transaction buffer address logic 812 by shifting the trans_INDX field left six bits, and generating the six low order bits using a binary counter. This forces Q-blocks to always start at multiples of 64. The binary counter resides internal to the transaction buffer address logic 812.

In addition to being addressed from the transaction queue 806, the transaction buffer 830 is also capable of being addressed by the VME bus 190 via bus IVME_ADR<31:1> directly as a read/write memory. Arbitration occurs on every cycle. VMEbus accesses have priority over accesses by the transaction buffer control logic 810 except for when the transaction buffer control logic 810 is writing the status word associated with the completion of an IOC packet. In that case, the VMEbus access is stalled for one clock cycle. If a VMEbus access occurs while an IOC packet is being loaded into the channel interface 124, the current IOC bus cycle is completed and the next non-NOP IOC bus cycle is held off for the duration of the VMEbus access, which typically is two or three clocks.

The transaction buffer 830 is a static RAM that can be read or written by either the VME Interface 128 or by the transaction buffer control logic 810. The transaction buffer 830 is operationally partitioned into Q-blocks. System software is responsible to allocate and manage Q-block resources. The transaction buffer 830 comprises four sections, a miscellaneous section 830A, an IOC_TAG section 830B, an IOC_DAT_H section 830C, and an IOC_DAT_L section 830D. Transaction buffer IOC_DAT_H section 830C and transaction buffer IOC_DAT_L section 830D, which illustratively are 8k×32 memories, contain the data that is driven onto the DCB (data channel bus) section of the IOC bus 110 through the channel interface 124. Transaction buffer IOC_TAG section 830B, which illustratively is an 8k×4 memory, contains the four bit TYPE_CODE data, which is driven onto the CB (control bus) portion of the IOC bus 110 through the channel interface 124. Transaction buffer MISC section 830A, which illustratively is an 8k×4 memory, contains the parity associated with the high data and low data sections and an END_IOP bit that is used to indicate the last word to be driven onto the IOC bus 110 for the current IOC packet.

The transaction buffer 830 is capable of being written or read directly by the VME bus 190 via the VME I/O interface 128 through the read-write transceivers 820. Data IVME_DAT<31:0> from the VMEbus I/O interface 128 is written into the transaction buffer 670 in three VMEbus cycles, in conjunction with assertion of the write enable signal WR. In one VMEbus cycle, signal oeld_TAG gates IVME_DAT<7:4> through read/write transceiver 820A and IVME_DAT<3:0> through read/write transceiver 820B. In another VMEbus cycle, signal oeld_HDAT gates IVME_DAT<31:0> through read/write transceiver 820C. In another VMEbus cycle, signal oeld_LDAT gates IVME_DAT<31:0> through read/write transceiver 820D. Data from the transaction buffer 670 is read and moved onto IVME_DAT<31:0> to the VMEbus I/O interface 128 three VMEbus cycles, in conjunction with assertion of the output enable signal OE. In one VMEbus cycle, signal oerd_TYPE gates data onto IVME_DAT<7:4> through read/write transceiver 820A and onto IVME_DAT<3:0> through read/write transceiver 820B. In another VMEbus cycle, signal oerd_HDAT gates data onto IVME_DAT<31:0> through read/write transceiver 820C. In another VMEbus cycle, signal oerd_LDAT gates data onto IVME_DAT<31:0> through read/write transceiver 820D. Data in the transaction buffer 830 is moved to the channel interface 124 over lines DCB <63:0> (sixty-four bit data channel bus) and line TYPE_CODE<3:0>, which is a part of the CB (control bus) portion of the IOC bus 110, under the control of signal oerd_BUFF, in accordance with output enable signal OE and the address <buff_ADR> from the transaction buffer address 812.

During an IOC transaction, header words, or Q-block entries, are read out of the Q-block indexed by the trans_INDX field, beginning with the first location within the indexed Q-block. Each header word read out is loaded into channel interface circuit 124 and driven onto the IOC bus 110. The transaction buffer control logic 810 checks each header word to determine if it is the last header word in the indexed Q-block by checking if the end_IOP bit is set in the current header word. Should the entire Q-block be read without detection of an end_IOP bit, the transaction status is generated indicating that the transaction completed with a protocol error, and a VMEbus interrupt is set to indicate that an error has occurred. After the VMEbus interrupt has been generated, a IOC_RST function is performed and the que_FRZ bit is set to stop further processing of queued requests.

Physical reads of the transaction buffer 830 are restricted to one per I/O request. If a physical read is driven onto the IOC bus 110 when the end_IOP bit is not encountered, a protocol error is set to terminate the transaction and to cause the generation of a transaction status word indicating that the transaction completed with a protocol error.

The header packet of an IOC transaction includes a word count type code (TYPE_CODE=WC) as the last header word to be processed from the transaction buffer 830. The WC type code acts as a "GO" signal to the source and destination logical devices. If a WC type code is read from the transaction buffer 830 during processing without the end_IOP bit being set, a protocol error is set to terminate the transaction and to cause the generation of a transaction status word indicating that the transaction completed with a protocol error.

On every read from the transaction buffer 830, the TYPE_CODE is decoded by the packet generator 814 for determining how to monitor and initiate the IOC packet, how the transaction will complete, and what type of completion word the packet control 814 writes. Examples of completion words are generating a transaction status for a device to device transfer, and writing physical read data into the Q-block. If the read word was not the last word, the address counter in the transaction buffer address logic 812 is incremented by 1, and a new header word is read from the current Q-block and loaded into the channel interface 124. This process continues until the end_IOP bit is encountered.

When the end_IOP bit is encountered by the transaction buffer control logic 810, the transaction buffer control logic 810 monitors the buffered IOC control signals of the packet generator 814 and completes the transaction when the appropriate control signal sequence is detected. For example, if the type codes that are driven onto the IOC bus 110 indicate that the transaction is a single physical write or multiple physical writes, then the transaction buffer control logic 810 (a) waits for de-assertion of IOC_ACTV and IOC_DXFER, as detected by the bus monitor 816 and in cooperation with the packet generator 814; (b) write a status word into the Q-block to indicate that the transaction completed successfully; (c) signals the queue interrupt generator 804 via trans_RETIRED that the transaction has completed; (d) resets internal logic; and (e) latches the output of the transaction queue 808 via trans_INDX for the next transaction or waits until the Not Empty Status flag goes true. A normal data transfer between two logical devices is processed in the same fashion.

Only one physical read occurs per I/O request. This is because each physical read returns 64 bits of data and only one dedicated Q-block entry is available for transaction status or physical read data. Once the physical read header word is driven onto the IOC bus 110, then the packet generator 814 (a) waits until data is ready to be read from the buffer of the channel interface 124; (b) unloads the data and writes it into the status entry IOC_TAG for the Q-block; (c) signals the queue interrupt generator 804 via trans_RETIRED that the transaction has completed; (d) resets internal logic; and (e) processes the next entry in the transaction queue 808, if one is available.

The following events will cause abnormal termination of the current IOC transaction: IOC_ERR, Protocol Error, IOC Timeout, and IOC_RST. Abnormal termination of an IOC transaction causes the transaction queue 806 to be frozen and the que_FRZ flag in the queue manager CSR 802 to be set.

The packet generator 814 is tightly coupled with the transaction buffer control logic 810 over line trans_CNTL. Packet generator 814 is responsible for generating direction controls and discrete IOC control signals, including type code TYPE_CODE<3:0>, load enable LD_EN, unload enable UNLD_EN, output enable OE, and error output ERR_OUT. Packet generator 814 is also responsible for monitoring the execution of a packet based on such signals as ready RDY, received RCVD, and error input ERR_IN. The packet generator 814 also generates status signals upon the completion of a packet, and freezes the transaction queue 808 if an IOC error (IOC_ERR) is detected. The packet generator 814 contains IOC watchdog functions such as a bus timeout function, which it executes in conjunction with an IOC bus monitor 816. The bus monitor 816 receives IOC hard error signal IOC_HERR, IOC soft error signal IOC_SERR, and signals IOC_ACTV and IOC_DXFER from respective lines of the control bus portion of the IOC bus 110, and furnishes timeout signal IOC_timeout and bus error signal IOC_buserr to the packet generator 814.

A queue interrupt generator 804 latches the interrupt vector int_VEC and the interrupt level int_LVL from the transaction queue 808 when a queue entry is read. When a transaction is completed, gen_INT from the transaction queue 808 signals the queue interrupt generator 804 to generate a VMEbus interrupt on line IVME_INT. Additionally, the queue interrupt generator 804 provides an interrupt vector INT_VEC and an interrupt level INT_LVL to an I/O processor for each transaction as the interrupt is acknowledged on line IVME_int_ACK, and is capable of stacking one interrupt request per VMEbus Interrupt level.

Since IOC transactions can complete faster than the VMEbus can acknowledge the interrupts generated by these transactions, an interlock between the transaction buffer control logic 810 and the queue interrupt generator 804 prevents transaction that would cause an overrun of interrupt requests from being retired. The I/O controller 120 generates only one interrupt on each level at any point in time. A transaction is prevented from being retired if its priority level is busy with a previous transaction.

As transactions are processed by the transaction buffer control logic 810, they are retired to the queue interrupt generator 804 as long as there is not an unacknowledged interrupt at the same VMEbus Interrupt level. If there is not an interrupt pending at the same level, the transaction is retired and the interrupt encoder latches the pending interrupt. The purpose of priority encoding is to present the highest VMEbus interrupt for retired processes to the VMEbus for Interrupt acknowledge. If the gen_INT bit in the Transaction Queue is not set, which indicates that no interrupt is required upon completion, the transaction does not have to wait.

Channel Interface Logic

In one embodiment, channel interfaces such as 124, 131, 141, 161, 171, and 181 are implemented as a set of two channel interface logic ("ChIL") integrated circuit chips. The ChIL chip set connects data to the IOC 110 through a 64-bit bidirectional port, and to the user device through either a 64-bit or a 128-bit bidirectional port. The 128-bit option allows a user device to clock data at half the speed of the I/O system 100 while still matching the bandwidth of the I/O system 100. Illustratively, the bandwidth of the I/O channel 100 in one embodiment is 230 MegaBytes/sec peak.

A ChIL chip set implements two slices, each instantiating half the data path. A low order slice or L-slice handles bits <31:00> of user device data and the leaf's starting buffer address, and bits <95:64> of user device data for the 128-bit option. A high order slice or H-slice handles bits <63:32> of user device data and the logical device's extended buffer address, and bits <127:96> of user device data for the 128-bit option. Each slice uses two asynchronous clocks—a channel clock and a user clock. Illustratively, data is buffered across clock domains through a FIFO organized as either 32 64-bit words or 16 128-bit words. The ChIL circuit set implements the IOC protocol and generate channel stalls according to FIFO status. Parity is both generated and checked at the channel connection. Illustratively, in one embodiment the channel clock rate is 35 nanoseconds, and the user-interface clock rate is 70 nanoseconds.

The ChIL circuit set is operable in either of two personalities, a master personality or a slave personality. A ChIL circuit set 124 assigned the master personality is used in association with the transaction controller 126 of the I/O controller 120, and functions to configure the I/O channel 100, to initiate transfers, and to collect status information. Illustratively, the I/O controller 120 is implemented on a single printed circuit board, and the set 124 of two ChIL chips are mounted on the board in association with the transaction controller 126. ChIL chip sets assigned the slave personality function to connect a user device to the IOC bus 110; for example, channel interface 131 in the IORAM 130, channel interface 141 in the IORAM 140, channel interface 161 in the frame buffer 160, channel interface 171 in the HIPPI interface 170, and channel interface 181 in the user defined interface 180 comprise respective ChIL sets.

A single logical device may connect to the channel through several slave ChIL chip sets. In this case, each set services a separate leaf of the user device. The ChIL chip contain logic to implement arbitrary powers-of-two interleaving.

A ChIL circuit 900 illustratively implemented as an integrated circuit and having its pins referenced to L-slice data is shown in FIG. 9. A ChIL circuit (not shown) for H-slice data is identical, hence will not be discussed. A user interface section 900A is shown in FIG. 9A, a status register section 900B is shown in FIG. 9B, a channel interface section 900C is shown in FIG. 9C, and a control, synchronization and status section is shown in FIG. 9D.

The user device side of the ChIL chip 900 may be implemented in any manner convenient to the user, in accordance with techniques well known in the art. In the illustratively implementation shown in FIG. 9A, user device data bits <31:00> are connected to UIdata<31:00> of the user interface pad 902 L-slice, and user device data bits <63:32> are connected to the same ports of the H-slice (not shown). Incoming signals are stored in an input register 904, and are applied to various flipflops 906, 908, 910 and 912, and various multiplexers 914 and 916, to a FIFO register 918. Output from the FIFO register 918 is applied through various drivers 920 and 924, and multiplexer 934 to an output register 936. Data from register 947 is applied to the output register 936 through driver 932. Output from the FIFO register 918 to other parts of the ChIL chip 900 are applied through drivers 922, 926 and 930.

Consider next the channel interface side of the ChIL chip 900. A ChIL chip set connects to the IOC 110 through a set of two Bus Interface Transceiver ("BIX") chips, represented generally by register 680 in FIG. 6B. Illustratively, the BIX set provides up to eight full-duplex and 76 half-duplex connections to the backplane. Six full-duplex connections are used for control and status. The half-duplex connections include 64 data bits, four type code bits, and five parity bits—four for data and one for the type code. The remaining connections are either spare, or are unconnected over the backplane.

The BIX chips implement registered transceivers. This introduces a one-cycle pipeline delay between a driving ChIL chip and the backplane, and another between the backplane and a receiving ChIL chip. This applies to both full- and half- duplex signals. Signals on the ChIL side of the BIX chips are assigned prefix "CH_" while signals on the IOC bus 110 side of the BIX chips are assigned prefix "IOC_". A signal appearing on both sides of the BIX chips has the same signal name, preceded by the appropriate prefix. For example, IOC_ACTV and CH_ACTV are the same signal.

The half-duplex connections—CHtype, CHdata, and CHpar—are shared by two ChIL sets. Normally, these connections are always driven by either the BIX set or one of the ChIL sets. Either ChIL set may request in one clock cycle to drive the half-duplex connections during the next cycle. If no ChIL set requests to drive, then the BIX set will drive. Each ChIL set monitors the other set's drive request. If both ChIL sets request to drive, an error is reported, and none of the ChIL or BIX sets will drive.

The six full-duplex channel signals are CHrst (reset), CHactv (active), CHdxfr (data transfer), CHack (acknowledge), CHerr (error), and CHstall. The ChIL chip 900 has output pins for each of these six signals and input pins for four of the six. There is a two-cycle backplane delay between any ChIL's assertion of its output pin and the BIXs' assertion of all ChILs' corresponding input pins.

CHrstout is asserted by the master H-slice in response to master reset. The resulting assertion of CHrstin causes all ChIL chips, including the master, to perform a full reset. This in turn causes all H-slices to assert UIrstout_.

CHactvout is asserted by the H-slice of any ChIL set driving data onto the channel. It is asserted in the same cycle that the channel word is presented on the CHdata pins, and remains asserted for seven more cycles. This is long enough for CHerrout_ and CHactvout to be asserted in the same cycle following a failure to appropriately assert CHackin. CHactv is not monitored by ChILs, only by the transaction controller.

CHdxfrout is asserted by the H-slice of any ChIL set expecting to receive data. This includes the master during a physical read and the targets of physical writes. Especially, however, it includes slave sets selected as destinations of data transfers. The destination slaves continue to assert CHdxfr until all the data expected by the user device has been unloaded from the FIFO. CHdxfr is not monitored by any of the ChIL chips on the IOC bus 110, but is monitored by the transaction controller 126.

CHackout is asserted by both slices of a target ChIL set to acknowledge receipt of a channel word. It is usually asserted by ChILs two cycles after the channel word is received on the CHdata pins. IOCTLR-board ChILs assert CHackout after a four-cycle delay in response to header words and physical reads and writes broadcast by the master. NOPs driven by slaves, however, are not ACK'ed and do not cause assertion of CHactvout. The resulting assertion of CHackin prevents the originating ChIL from reporting an error. If either target slice fails to assert CHackout, then channel signal CHack should not be asserted.

CHerrout_ is asserted by either slice of any ChIL set to indicate an error. The resulting assertion of CHerrin causes all ChILs involved in a data transfer to abort. CHerr is also monitored by the transaction controller to indicate an abnormal ending of the transaction.

CHstallout may be asserted by the H-slice of any slave ChIL set involved in a data transfer. It is asserted after the selection of a slave as source or destination until all ChIL sets are ready to proceed. It is also asserted by any destination slave with too few empty FIFO slots, and by any source slave too few valid FIFO words. The resulting assertion of CHstallin causes the source slave to send a NOP word on its CHdata pins. It also causes the destination slave to expect that NOP word, and it inhibits the advancement of source and destination word and bus-address counters. CHstall is also monitored by the transaction controller 126 and indicates the continuation of a data transfer.

In the absence of errors, the transaction controller 126 deems a transaction to commence when CHactv is true, to persist until CHdxfr is true, then to be complete when the logical OR of CHactv, CHdxfr, and CHstall is false.

The ChIL 900 responds to the four bit type codes that accompany channel data as described previously in the context of Table 2.

Figure 9A:
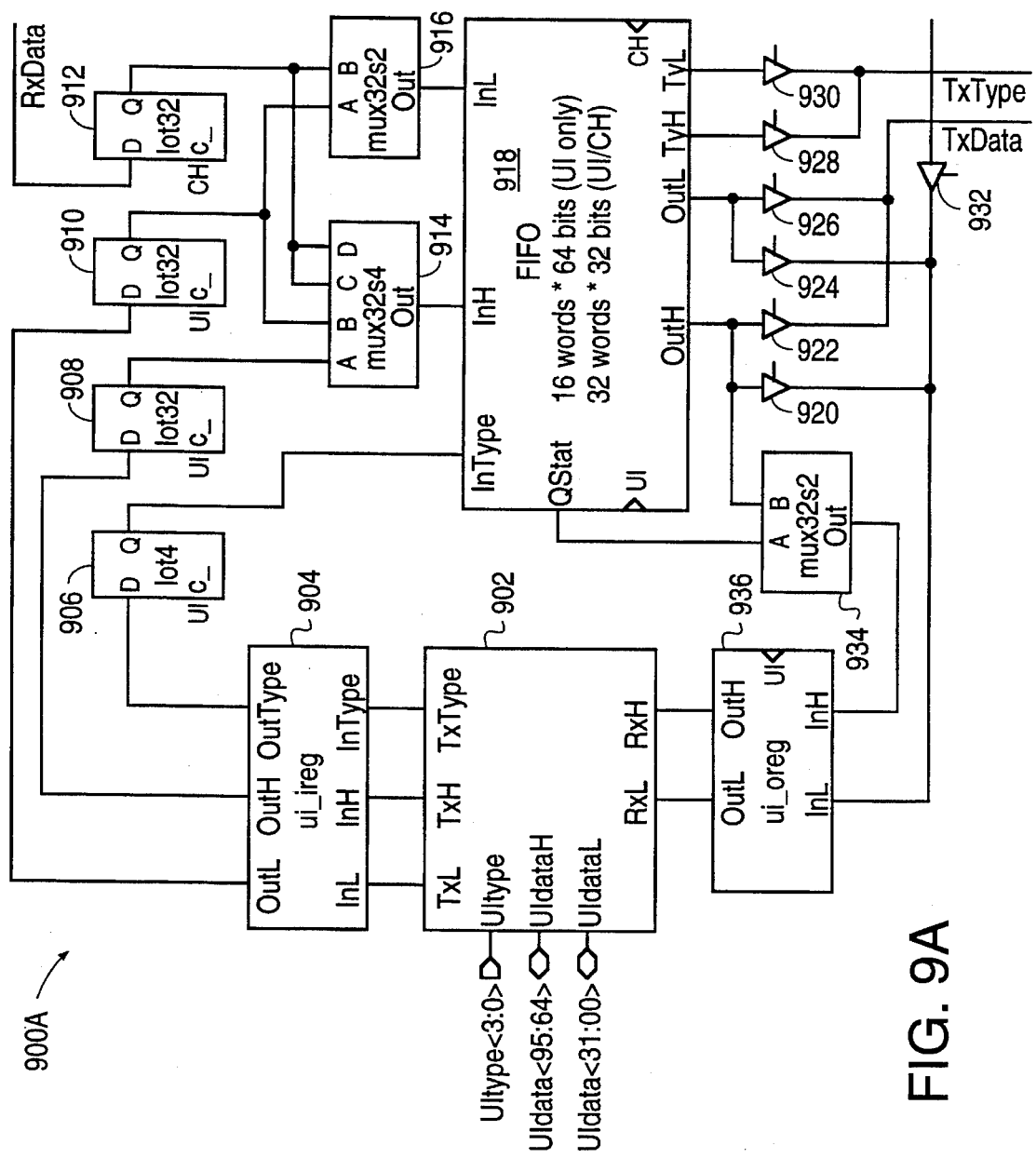
Figure 9B:
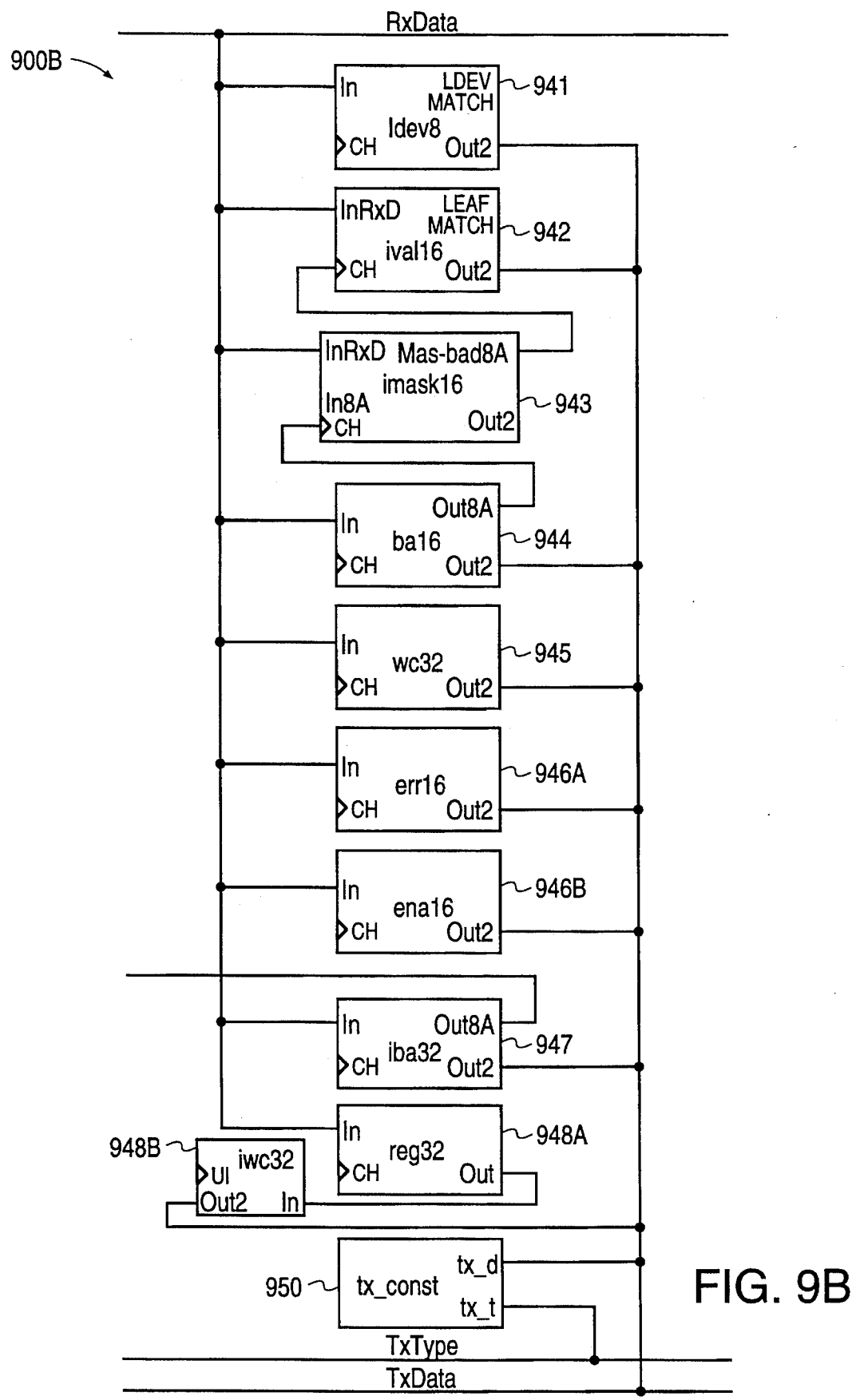
Figures 1, 9C:
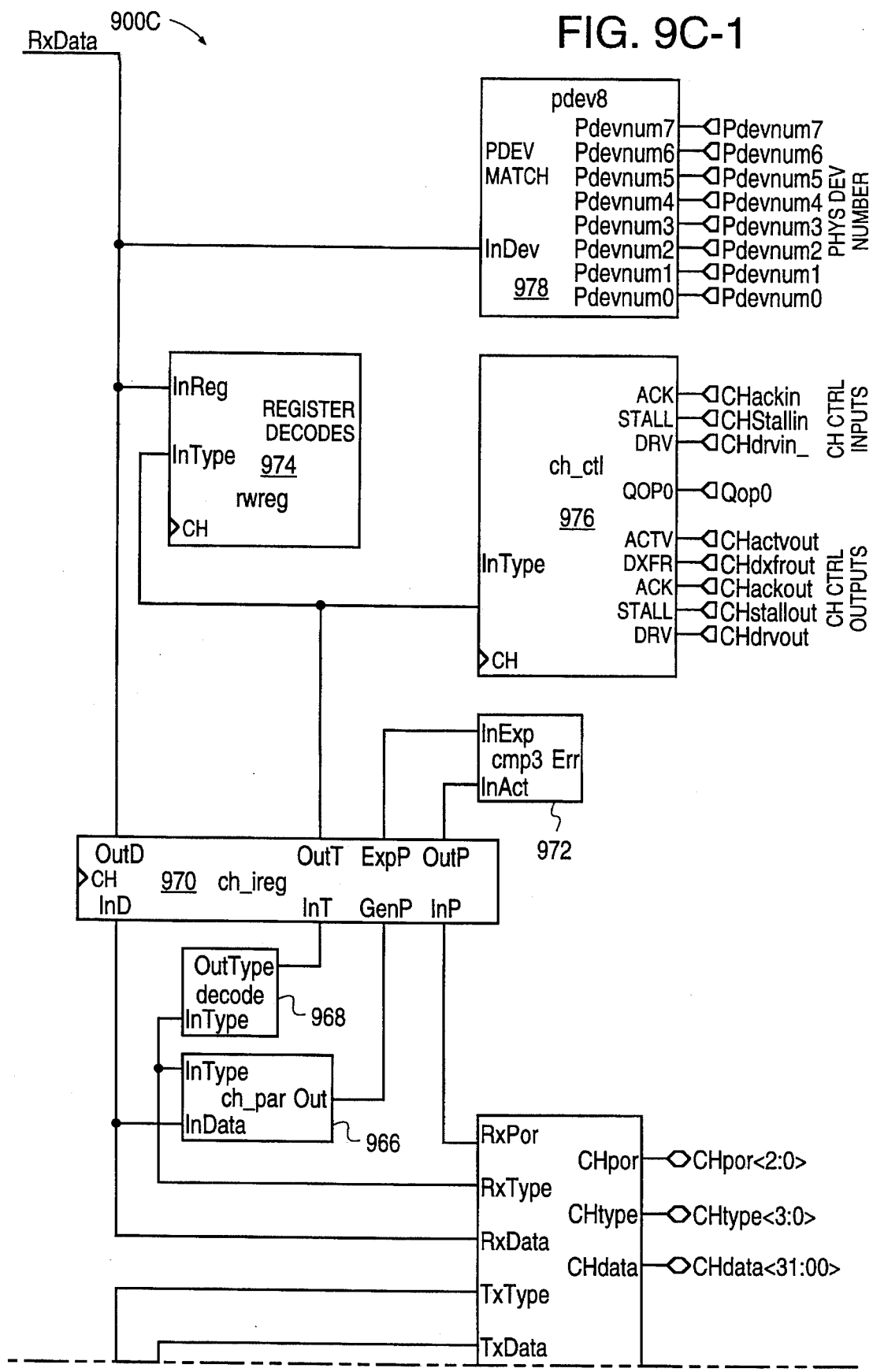
Figure 9D:
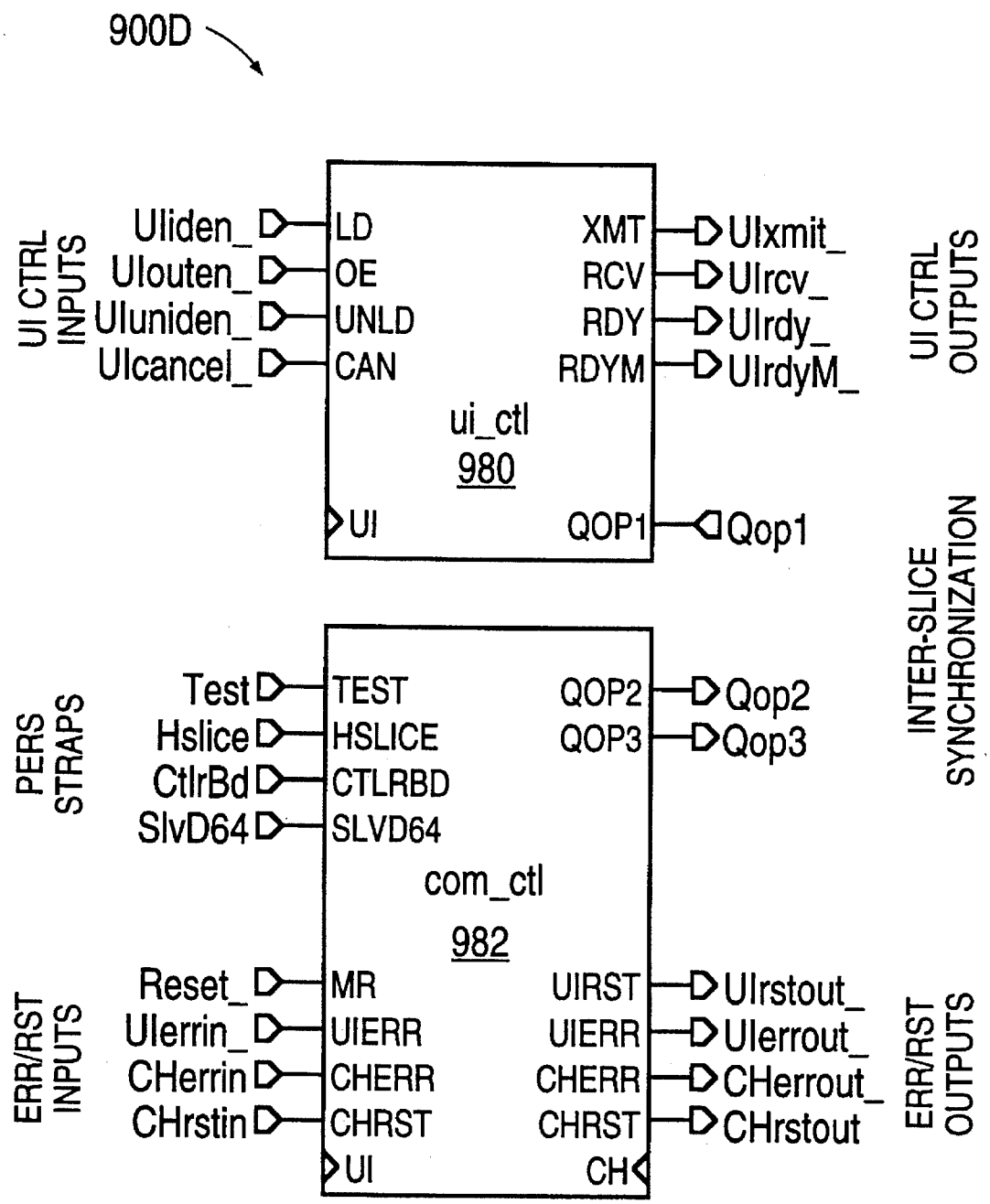

The ChIL chip 900 has eight addressable registers, as shown in FIG. 9B. They are capable of being read and written by the master via physical read and write operations. Additionally, some registers in a selected logical device can be written via type codes broadcast in the header.

The bus address register, or BA register 944, is a 16-bit counter used to determine the current leaf. A specific ChIL set is the current leaf if and only if its registers satisfy the expression (BA & IMASK)=IVAL. For the arrangement shown in FIGS. 3A and 3B, for example, the values of IVAL and IMASK are listed below in Tables 7 and 8, respectively.

TABLE 7

| Physical Device (slot) Number | Logical Device IMASK | Burst IVAL | Number | Count |
|---|---|---|---|---|
| 1 | 001100 | 000000 | 1:4 way interleaved | 4 |
| 2 | 001100 | 000100 | 1: way interleaved | 4 |
| 3 | 001100 | 001000 | 1:4 way interleaved | 4 |
| 4 | 001100 | 001100 | 1:4 way interleaved | 4 |
| 5 | 0010000 | 0000000 | 2:2 way interleaved | 16 |
| 6 | 0010000 | 0010000 | 2:2 way interleaved | 16 |

TABLE 8

| Physical Device (Slot) Number | IMASK | IVAL | Logical Device Number | Burst Count |
|---|---|---|---|---|
| 1 | 0011000 | 0000000 | 1:4 way interleaved | 8 |
| 2 | 0011000 | 0001000 | 1:4 way interleaved | 8 |
| 3 | 0011000 | 0010000 | 1:4 way interleaved | 8 |
| 4 | 0011000 | 0011000 | 1:4 way interleaved | 8 |

TABLE 8-continued

| Physical Device (Slot) Number | IMASK | IVAL | Logical Device Number | Burst Count |
|---|---|---|---|---|
| 5 | 0010000 | 0000000 | 2:2 way interleaved | 16 |
| 6 | 0010000 | 0010000 | 2:2 way interleaved | 16 |

Source devices load BA in response to the SBA type code; destinations in response to DBA type code. Also, the logical device most recently selected by SDS or DDS loads BA in response to LSEL. All source and destination leaves increment BA whenever the current source leaf removes a data word from its FIFO and loads it into its output register.

The logical device register, or LDEV register 941, holds the logical device number common to all ChIL sets (leaves) constituting a logical device. A ChIL chip becomes selected as a source or destination if its LDEV register matches the logical device number broadcast with the SDS or DDS type code.

The word count register, or WC register 945, is a 32-bit counter that determines the number of 64-bit data words to be transferred over the channel. Source and destination devices load WC in response to the WC type code. All source leaves decrement WC whenever the current source leaf removes a data word from its FIFO and loads it into the channel-output register. All destination leaves decrement WC whenever the current destination leaf inserts a data word into its FIFO from its channel-input register. When WC is zero, source leaves will not send data and destination leaves will not accept or acknowledge data.

The control and status register 946 includes error register 946A and control register 946B. Detection of an error condition sets the appropriate status bit. Generally, the control bits affect only chips having a slave personality.

The interleave mask register, or IMASK register 943, and the interleave value register, or IVAL register 942, are used to determine the current leaf. See the. description of the Bus Address register 944 above.

The interleaved buffer address register, or IBA register 947, holds in slave operation the starting address of the user device. The H-slice of the source device loads IBA in response to the ESBA type code; the destination in response to EDBA type code. The L-slice of the selected leaf of a source or destination device loads IBA in response to the IBA type code. For master operation, IBA is loaded during a physical read in response to ND.

The interleaved word count register, or IWC register 948, is a 32-bit counter that determines the number of data words to be transferred over the user interface. It counts either 64- or 128-bit words according to the selected data size. The selected leaf of a source or destination device loads IWC in response to the IWC type code. Synchronization between clock domains may delay the availability of a newly loaded IWC value by several cycles. A source device decrements IWC when an uncancelled data word is inserted into its FIFO. A destination device decrements IWC when a data word is unloaded from the user interface.

As previously mentioned, one logical device may be implemented with several physical devices using a technique called interleaving. The ChIL chip 900 advantageously implements interleaving as follows.

During initialization of the I/O system 100 in which all ChIL chips are reset and initialized during system boot, all leaves of a given logical device have LDEV written with the same value. Each leaf's IMASK and IVAL values are calculated from: (a) the burst size (number of channel words per leaf), (b) the number of leaves comprising a logical device, and (c) the leaf number of the given leaf within the logical device. An illustrative software method to calculate these values is given in FIG. 10(a,b,c). These values may be calculated in any convenient manner, including in hardware if desired.

A data transfer between slaves is initiated by broadcasting a header from the master. The type codes and values comprising the header are written to one of the I/O controller 120 board's transaction buffer queue blocks. Header words fall into three groups. The first group initializes source device registers, the second initializes destination device registers, and the last group initializes channel registers and starts the transfer. The type codes within the header are ordered. Within source and destination groups, the first type code is SDS or DDS, which selects the logical device. Initial source and destination bus addresses are set with SBA and DBA type codes. These values set the initial leaf and the initial offset within the leaf. Either may be omitted for a non-interleaved device. Next, the logical device's extended buffer address registers are written with an ESBA or EDBA type code. Finally, each leaf is programmed with LSEL, IWC, and IBA type codes.

Within the leaf-programming triplet, the first type code is the LSEL that selects the desired leaf. The LSEL value is not the leaf number, but any bus address within the leaf's range. Next, the IWC type code sets the number of user-device words to be transferred to or from the leaf's user device. Each user device word may be either one or two channel words, depending on 64- or 128- bit UIdata option strapping. The triplet ends with the IBA type code, which sets the leaf's initial Interleaved Buffer Address.

All devices use at least one leaf-programming triplet per leaf. Non-interleaved devices are implemented as a single leaf.

The last type code is WC. It sets the total number of 64-bit words to be transferred over the channel and starts the transfer.

The ChIL chip 900 advantageously implements diagnostics as follows. Single-word diagnostic writes are done by a ChIL chip set having a master personality, which is capable of writing 64-bit words to a ChIL chip set having a slave personality, one word at a time. This method is especially useful for testing the I/O control board's slave's user-data connections to IORAM.

First, write the slave's CSR with ASRT_RST, then with zero. This resets the slave's IORAM interface. Next, write the starting 64-bit IORAM address to the slave's IBA register. The IOCTLR ignores the H-slice value and uses only the L-slice value. Other boards may give secondary interpretation to otherwise unused IBA H-slice bits (e.g., ESBA and EDBA).

Now write the slave's CSR with ASRT_RCV OR'ed with AUTO_RDY. The ASRT_RCV bit will drive the slave's UIrcv_ output low, causing the IORAM interface to unload the starting address. Then write each 64-bit data word to the slave's IBA register. Write the H-slice IBA with bits <63:32> and the L-slice with <31:00>. With the AUTO_RDY bit set, writing the IBA drives the slave's UIrdy_ output low until the data is unloaded. When done, the slave's CSR is written with ASRT_RST, then with zero.

Input/Output RAM Physical Device

Figure 11A:
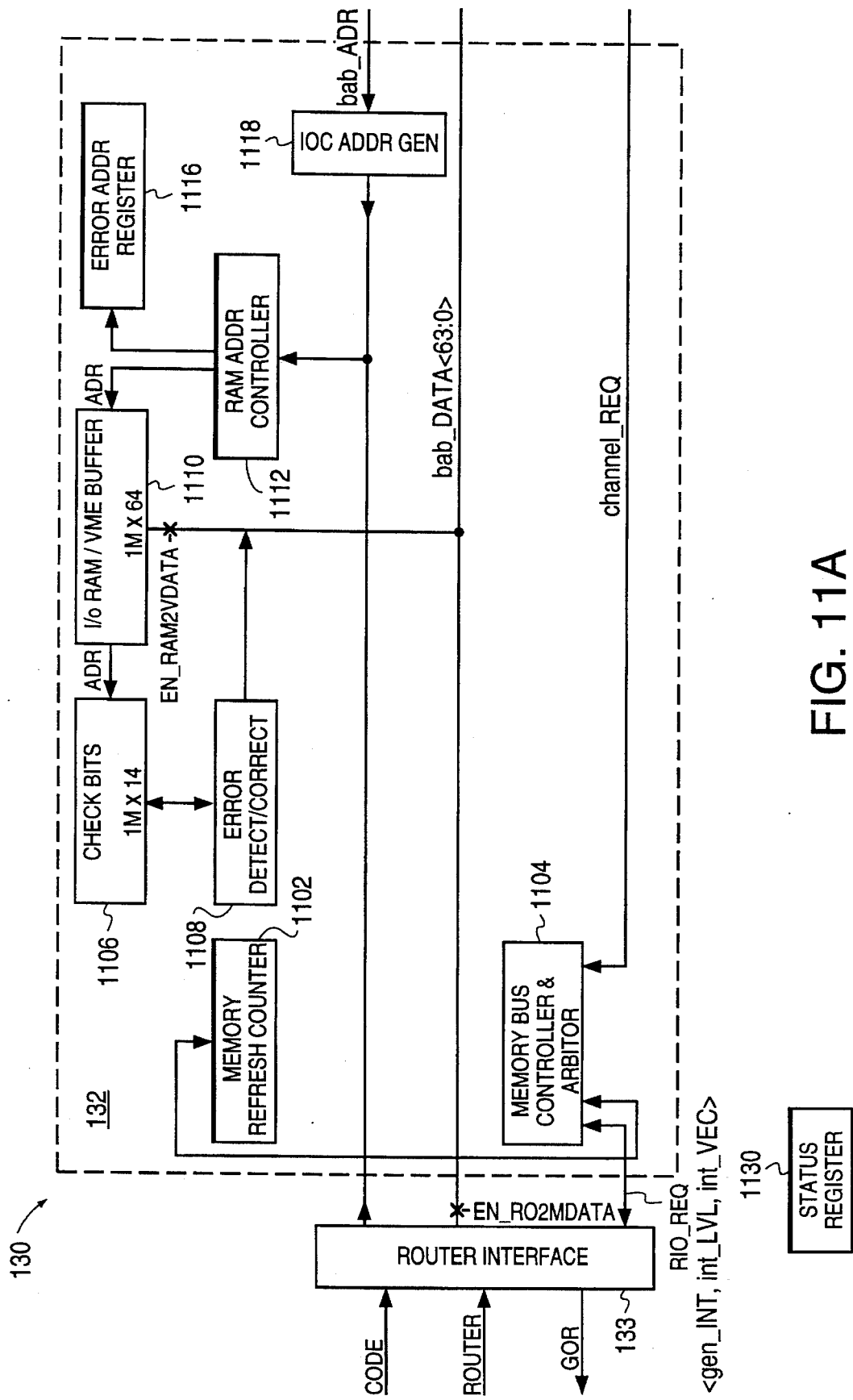

FIG. 11(a,b) shows an illustrative embodiment of IORAM device 130. The IORAM 130 is connected to the IOC bus 110 through the channel interface 131 and the BIX register 1180. A physical device select circuit 1120 is also connected to the IOC bus 110 through the register 1180, and uniquely identifies the IORAM 130 for the purpose of a physical access to the IORAM 130.

The channel interface 131 is connected to various circuits of the IORAM 130, including an input port of IOC address generator 1118 via bank access address bus bab_ADR<63:0>, a data port of random access I/O buffer memory 1110 via bank access data bus bab_DATA<63:0>, and a port of the memory bus controller and arbiter 1104 via signal line channel_REQ. The IOC address generator 1118 is connected to an input of RAM address controller 1112, which addresses the I/O buffer 1110. The input of RAM address controller 1112 is also connected to router interface 133. The data port of the I/O buffer 1110 is also connected to the router interface 133 via bus bab_DATA. The memory bus controller and arbiter 1104 is also connected to the router interface 133 by request signal line RIO_REQ. The I/O buffer 1110 also drives check bit array 1106, which is connected to error detection and correction circuit 1108, which in turn is connected to bus bab_DATA. The memory bus controller and arbiter is also connected to a memory refresh counter 1102.

Illustratively, IORAM 130 provides the following features: 128 MegaBytes of error-corrected RAM for use as an I/O buffer, 256 MegaByte/second peak data transfer rate between an MP-1 processor element array and one physical IORAM device using a direct connection to the global router (not shown); and greater than 100 MegaByte/second peak data transfer rate between the IOC and the I/O Buffer.

While the invention has been described with respect to the embodiments set forth above, the invention is not necessarily limited to these embodiments. Accordingly, other embodiments, variations and improvements not described herein are not necessarily excluded from the scope of the invention, which is defined by the following claims.

What is claimed is:

1. In a data processing system input/output ("I/O") channel, a method for effecting a block data transfer between physical devices coupled through respective interfaces to a data I/O bus, comprising the steps of:

assigning a unique physical address to each of the interfaces;

individually configuring a particular one of the interfaces by:

broadcasting to the interface a first header to select the particular interface in accordance with the physical address thereof for receipt of configuration data; and subsequent to said first header broadcasting step, broadcasting configuration data, including a logical device assignment, to the interfaces;

wherein the particular interface acquires a configuration, including a logical device assignment, in accordance with the configuration data, and the interfaces other than the particular interface are not configured by the configuration data;

repeating said individual interface configuration step so that each of the interfaces are configured;

initiating an I/O transaction on the bus by placing a second header on the data I/O bus to select one or more of the physical devices as a source logical device in accordance with the logical device assignments of their respective configured interfaces, and one or more of the physical devices as a destination logical device in accordance with the logical device assignments of their respective configured interfaces, at least one of the source logical device and the destination logical device comprising a subset of at least two of the physical devices, and the second header identifying for each of the physical devices in the subset a schedule of mutually exclusive and repeated participation in the block data transfer; and activating the source logical device and the destination logical device as established in the initiating step to autonomously achieve the block data transfer based upon the schedules.

2. A method as in claim 1, wherein the I/O channel comprises a backplane and a plurality of printed circuit board assemblies plugged into respective slots of the backplane, each printed circuit board assembly including thereon at least one interface, and wherein said unique physical address assigning step comprises the step of assigning a unique binary value to each of the interfaces in accordance with the backplane slot into which an interface is plugged and the number of any other interfaces sharing the same printed circuit board assembly.

3. A method as in claim 1, wherein:

the header comprises a physical access type code, physical identification data, and register identification data, the interfaces being responsive to the physical access type code for comparing their physical addresses with the physical identification data, and the interface having a matching physical address being responsive to the physical access type code for designating a register therein in accordance with the register identification data; and the configuration data includes a normal data ("ND") type code and a logical address, the interface having the matching physical address being responsive to the ND type code for loading the logical address into the designated register.

4. A method as in claim 3, wherein the physical access type code is a physical write select type code.

5. A method as in claim 1:

wherein the interfaces of the I/O channel perform various functions in accordance with type codes presented thereto;

wherein said I/O transaction initiation step comprises, in the context of selecting a source logical device, the steps of:

broadcasting to the interfaces a header word including a source device select ("SDS") type code and a first logical address, the interfaces being responsive to the SDS type code for comparing their logical address with the first logical address;

broadcasting to the interfaces a header word including a source buffer address ("SBA") type code and a first buffer address, each interface having a logical address matching the first logical address being responsive to the SBA type code for receiving the first buffer address; and broadcasting to the interfaces a header word including a word count type code and a first word count, each interface having a logical address matching the first logical address being responsive to the word count type code for receiving the first word count;

wherein said I/O transaction initiation step further comprises, in the context of selecting a destination logical device, the steps of:

broadcasting to the interfaces a header word including a destination device select ("DDS") type code and a second logical address, the interfaces being responsive to the DDS type code for comparing their logical address with the second logical address;

broadcasting to the interfaces a header word including a destination buffer address ("DBA") type code and a second buffer address, each interface having a logical address matching the second logical address being responsive to the DBA type code for receiving the second buffer address; and broadcasting to the interfaces a header word including a word count type code and a second word count, each interface having a logical address matching the second logical address being responsive to the word count type code for receiving the second word count;

and wherein said initiating step comprises the steps of:

individually initiating each of the interfaces configured as the source logical device to source a number of words based on the first word count and the first buffer location; and individually initiating each of the interfaces configured as the destination logical device to receive a number of words based on the second word count and the second buffer location.

6. A method as in claim 5, wherein the configuration information of said first header broadcasting step further comprises a leaf assignment; and wherein said I/O transaction initiation step further comprises, in the context of selecting a source logical device, the steps, following said SDS type code broadcasting step, of:

broadcasting to the interfaces a header word including a leaf select ("LSEL") type code and a leaf identifier; and comparing for interfaces having logical addresses matching the first logical address their respective leaf assignments with the leaf identifier, an interface having a matching leaf assignment beginning the sourcing of words.

7. A method as in claim 6, wherein each interface of the source Logical device stores the first buffer address and increments its stored first buffer address upon each sourcing of a word to the I/O bus; and wherein each interface of the source logical device compares its incremented stored first buffer address with its leaf assignment for deciding whether to source words to the I/O bus.

8. A method as in claim 7, wherein the leaf assignment comprises an interleave value parameter IVAL and an interleave mask parameter IMASK, an interface of the source logical device deciding to source words to the I/O bus when its incremented stored first buffer address logically ANDed with IMASK equals IVAL.

9. A method as in claim 5, wherein the configuration information of said first header broadcasting step further comprises a leaf assignment; and wherein said I/O transaction initiation step further comprises, in the context of selecting a destination logical device, the steps, following said DDS type code broadcasting step, of:

broadcasting to the interfaces a header word including a leaf select ("LSEL") type code and a leaf identifier; and comparing for interfaces having logical addresses matching the first logical address their respective leaf assignments with the leaf identifier, an interface having a matching leaf assignment beginning the sourcing of words.

10. A method as in claim 9,
wherein each interface of the destination logical device stores the second buffer address and increments its stored second buffer address upon each sourcing of a word to the I/O bus; and
wherein each interface of the source logical device compares its incremented stored second buffer address with its leaf assignment for deciding whether to receive words from the I/O bus.

11. A method as in claim 10, wherein the leaf assignment comprises an interleave value parameter IVAL and an interleave mask parameter IMASK, an interface of the source logical device deciding to source words to the I/O bus when its incremented stored second buffer address logically ANDed with IMASK equals IVAL.

12. A method as in claim 5, wherein said word count type code is an interleave word count ("IWC") type code.

13. A method as in claim 5, wherein said word count type code is an IOC word count ("WC") type code.

14. In an input/output ("I/O") channel of a data processing system, a method for effecting a block data transfer between a plurality of physical I/O devices coupled through respective associated interfaces to an I/O bus, comprising the steps of:
establishing a first logical device from a first plurality of the physical I/O devices by programmably assigning to each of the associated interfaces a first logical device identifier, a leaf identifier determining when the associated physical device participates relative to a first data transfer in the block data transfer, a burst count specifying the number of consecutive transfers for which the associated physical device is responsible when its interleave period arrives, and an interleave factor identifying how often the associated physical device participates in the block data transfer;
establishing a second logical device from at least one of the physical devices not in the first plurality of physical I/O devices by programmably assigning to the associated interface a second logical device identifier;
selecting one of the first and second logical devices as a source logical device by placing on the I/O bus a first plurality of header words;
selecting the other of the first and second logical devices as a destination logical device by placing on the I/O bus a second plurality of header words; and
activating the source logical device and the destination logical device to achieve the block data transfer, wherein only one of the physical devices configured as the first logical device participates in the block data transfer at any given time in accordance with its respective leaf identifier.

15. A method as in claim 14, wherein the first and second plurality of header words are included in a single header.

16. A method as in claim 14, wherein said step of establishing a second logical device comprises the step of establishing the second logical device from a second plurality of the physical I/O devices by programmably assigning to each of the associated interfaces a leaf identifier determining when the associated physical device participates relative to a first data transfer in the block data transfer, a burst count specifying the number of consecutive transfers for which the associated physical device is responsible when its interleave period arrives, and an interleave factor identifying how often the associated physical device participates in the block data transfer; and wherein only one of the physical devices configured as the first logical device and only one of the physical devices configured as the second logical device participate in the block data transfer at any given time in accordance with their respective leaf identifiers.

17. An input/output ("I/O") channel comprising:
a bus;
a plurality of physical devices;
a plurality of interfaces connecting respective physical devices to the bus, each of the interfaces having a unique physical identification, a set of configuration registers, including a word count register, and a data buffer, each of the interfaces being:
operable in a physical device mode for setting its configuration register set in accordance with data on the bus;
operable in a logical device mode for transferring block data between its data buffer and the bus in accordance with its word count register; and
operable in a background mode for transferring data between its data buffer and its associated physical device; and
a transaction controller connected to the bus, the transaction controller being:
operable in a physical device access mode for placing on the bus data for selecting a particular interface in accordance with its physical identification and subsequently for placing on the bus configuration data, including logical assignment data, for the particular interface; and
operable in a logical device access mode for placing on the bus data for selecting one or more of the interfaces as a source logical device in accordance with their logical assignment data, for selecting one or more of the interfaces as a destination logical device in accordance with their logical assignment data, and for initiating a block transfer between the source logical device and the destination logical device, wherein at least one of the data for selecting source logical device interfaces and the data for selecting destination logical device interfaces selects plural interfaces and identifies for each of the selected interfaces a schedule of mutually exclusive and repeated participation in the block data transfer to autonomously achieve the block data transfer between the source logical device and the destination logical device based upon the schedules.

18. A high speed input/output ("I/O") channel to support I/O transactions for a high performance data processing system, the I/O channel having a slotted backplane for receiving physical I/O devices implemented at least in part on printed circuit board assemblies ("PCBAs"), the I/O channel comprising:
an I/O channel ("IOC") bus implemented in the backplane;
a bus implemented in the backplane, said I/O device PCBAs being plugged into said bus and communications with the respective physical I/O devices being achieved by addressing a particular one of the physical I/O devices and transferring data thereto;
an IOC controller implemented on a PCBA, the IOC controller PCBA being plugged into said IOC bus and into said bus;
an I/O processor connected to said bus for communicating configuration information to said I/O processors, for scheduling I/O transactions, and for servicing the status from I/O transactions;

a plurality of I/O random access memories ("IORAMs") for maintaining communication with the high performance data processing system, said IORAMs being implemented on respective PCBAs;

a plurality of channel interface circuits implemented respectively on the I/O device PCBAs and the IORAM PCBAs for respectively interfacing said physical I/O devices and said I/O random access memories to said IOC bus, the I/O device PCBAs and the IORAM PCBAs being plugged into said IOC bus;

wherein said IOC controller includes:

means responsive to the configuration information from said I/O processor for assigning logical device identifiers to the channel interface circuits over said IOC bus to configure the physical I/O devices and the I/O random access memories into various logical devices, at least one of the logic devices comprising plural physical devices; and means for initiating block data transfer operations between any two of the various logical devices over said IOC bus, including means for identifying to each of the plural physical devices a schedule of mutually exclusive and repeated participation in the block data transfer to autonomously achieve the block data transfer between the logical devices based upon the schedules.

19. An I/O channel as in claim 18, wherein said I/O devices include a variety of I/O devices, including a disk array, a frame buffer, and a high performance parallel interface.

20. An I/O channel as in claim 18, wherein said IOC bus comprises:

a data path bus;

a control bus having a plurality of individual lines for controlling and operations on said IOC bus and a type code bus; and a clock line.

21. An I/O channel as in claim 18, wherein said IOC controller further comprises means responsive to the configuration information from said I/O processor for interleaving physical devices having common logical device identifiers in accordance with addresses of slots into which their respective channel interface circuits are plugged.

* * * * *